(12) United States Patent
Arakai et al.

(10) Patent No.: US 7,430,065 B2
(45) Date of Patent: Sep. 30, 2008

(54) METHOD AND SYSTEM FOR CORRECTING DISTORTIONS IN IMAGE DATA SCANNED FROM BOUND ORIGINALS

(75) Inventors: Tadashi Arakai, Kanagawa (JP); Haike Guan, Kanagawa (JP)

(73) Assignee: Ricoh Company, Ltd, Tokyo (JP)

( * ) Notice: Subject to any disclaimer, the term of this patent is extended or adjusted under 35 U.S.C. 154(b) by 1506 days.

(21) Appl. No.: 10/227,743

(22) Filed: Aug. 26, 2002

(65) Prior Publication Data

US 2006/0193533 A1    Aug. 31, 2006

(30) Foreign Application Priority Data

Aug. 27, 2001  (JP) ............................. 2001-256969
Aug. 27, 2001  (JP) ............................. 2001-256971
Aug. 27, 2002  (JP) ............................. 2002-247643

(51) Int. Cl.
*H04N 1/40*    (2006.01)

(52) U.S. Cl. ..................................... 358/3.26; 358/3.24

(58) Field of Classification Search ................ 358/3.26, 358/3.24, 1.9, 482, 468, 451, 448–449
See application file for complete search history.

(56) References Cited

U.S. PATENT DOCUMENTS 4,551,626 A * 11/1985 Agano .................... 250/586

FOREIGN PATENT DOCUMENTS

JP           2003234888 A  *  8/2003
SU              1059422 A  *  12/1983

* cited by examiner

*Primary Examiner*—Thomas D Lee
*Assistant Examiner*—Stephen M Brinich
(74) *Attorney, Agent, or Firm*—Knoble Yoshida & Dunleavy LLC

(57) ABSTRACT

During scanning bound originals such as a book, a bound portion of the book is often scanned into distorted image since the bound portion is lifted from a common scanning surface. As a result of the distorted image, the bound portion needs to be corrected before the scanned image data is further process. To correct the bound portion, a set of indexes is used to determine an amount of correction. The correction indexes include a page outline, a rule line and a character line of the scanned image data.

90 Claims, 28 Drawing Sheets

SUB-RUNNING DIRECTION

MINIMAL CIRCUMSCRIBED / RECTANGLE EXTRACTION

LINE EXTRACTION

METHOD AND SYSTEM FOR CORRECTING DISTORTIONS IN IMAGE DATA SCANNED FROM BOUND ORIGINALS

FIELD OF THE INVENTION

The current invention is generally related to, and more particularly related to distortion correction and more particularly related to the correction of distortion that is caused in a bound portion of a bound book.

BACKGROUND OF THE INVENTION

In duplicating an original using a flat bed scanner, the original is mostly a sheet. After the original sheet is placed on a contact glass surface of the scanner, a movable cover is placed over the original sheet to scan the original images. However, the original is not limited to sheets and includes bound materials such as books and booklets. The bound materials are also placed on the contact glass surface for scanning. As shown in FIG. 48, when a book original 100 is used, a bound portion 101 is lifted and not contacting the contact glass surface 102. Since the lifted bound portion 101 is away from the focus surface of the contact glass 102, the corresponding scanned image portion becomes inferior and includes distorted images, shadows, character distortions. Generally since the inferior image bound area 101 is hard to read, the character recognition (OCR) rate significantly degenerates. Particularly, a thick bound book causes a high rate of the OCR failures. To maintain the bound portion 101 on the focus plane 102 by pressing the book 100 onto the contact glass 102, one can damage the original book 100.

To solve the above described problems, prior art has proposed a method of correcting image distortion by speculating a three dimensional shape from the image density information. One exemplary speculation method for the three dimensional shape based upon the image density is as follows: T. Wada, H, Uchida and T. Matsuyama, "Shape from Shading with Inter reflections under a Proximal Light Source: Distortion-Free Copying of an Unfolded Book," International Journal Computer Vision 24(2), 125-135 (1997). In the above reference, a method called, "Shape from Shading" is a typical example. Unfortunately, since the Shape from Shading method requires a long calculation time for the distortion correction process, the practical use of this method is difficult. Another prior art technology as disclosed in Japanese Patent Publication Hei 5-161002 includes a proposed method of correcting the distortion based upon the book shape that is measured by triangulation. Despite the simplicity, since triangulation requires a special shape measuring device for measuring the book shape, this prior art technology is also practical.

Yet another prior art technology as disclosed in Japanese Patent Publication Hei 11-41455 includes a proposed method of speculating a three dimensional shape of the book surface based upon the page outline shape of the scanned image. Although the amount of calculation is limited for the distortion correction, this prior art technology fails to effectively correct the distortion when the page shape is cut off and not completely included in the scanned image.

For the above shortcomings, a newly proposed distortion correction device effectively correct the distortions based upon a limited amount of calculation even if the page outline is cut off from the scanned image. Although the above newly proposed distortion correction device utilizes the information on character lines and rule lines rather than the page outline to correct the image distortion, the distortion correction is not perfect and still has some issues to be resolved. For example, when the rule line is broken due to fading, the rule line information is inaccurately extracted, and the correction accuracy is lowered. Furthermore, when the character line and photographic portions are erroneously identified, the character line information is inaccurately extracted. As a result, the correction accuracy is also lowered. The above described problems remain to be desired.

SUMMARY OF THE INVENTION

In order to solve the above and other problems, according to a first aspect of the current invention, a method of correcting distortion caused by scanning, including the steps of: scanning an original into scanned image data; determining whether any of a predetermined correction data set of a page outline, a rule line and a character line exists in the scanned image data; and correcting the distortion based upon the existence of the correction data set, the page outline being used based upon a first priority, the rule line and the character line being used based upon a second priority.

According to a second aspect of the current invention, a system for correcting distortion caused by scanning, including: a scanner for scanning an original into scanned image data; an image data processing unit connected to the scanner unit for determining whether any of a predetermined correction data set of a page outline, a rule line and a character line exists in the scanned image data; and an image distortion correction unit connected to the image data processing unit for correcting the distortion based upon the existence of the correction data set, the page outline being used based upon a first priority, the rule line and the character line being used based upon a second priority.

According to a third aspect of the current invention, a storage medium containing a software program for correcting distortion caused by scanning, the software program performing the tasks of: scanning an original into scanned image data; determining whether any of a predetermined correction data set of a page outline, a rule line and a character line exists in the scanned image data; and correcting the distortion based upon the existence of the correction data set, the page outline being used based upon a first priority, the rule line and the character line being used based upon a second priority.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Based upon incorporation by external reference, the current application incorporates all disclosures in the corresponding foreign priority documents (JPAP2001-256969, JPAP2001-256971, both filed on Aug. 27, 2001) from which the current application claims priority.

Figure 1:
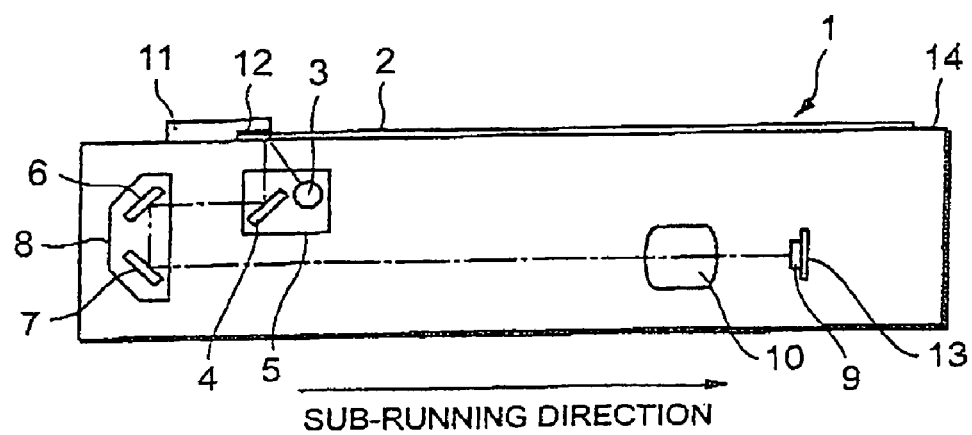
FIG. 1 is a diagram illustrating a cross sectional view of an image reading unit or a scanner of one preferred embodiment according to the current invention.

Referring now to the drawings, wherein like reference numerals designate corresponding structures throughout the views, and referring in particular to FIG. 1, a diagram illustrate a cross sectional view of an image reading unit or a scanner 1 of one preferred embodiment according to the current invention. The scanner 1 further includes a contact glass 2 for placing an original, a first scanning body 5, a second scanning body 8, a charge coupled device (CCD) 9 having pixels for reading the original image, a lens unit 10 for forming an image on the CCD, an original scale 11, a white standard board 12 and a frame 14. The first scanning body 5 further includes an exposing lamp 3 for exposing the original and a first reflection mirror 4. The second scanning body 8 further includes a second reflection mirror 6 and a third reflection mirror 7. The original scale 11 is used as a reference position and holds the contact glass 2 at a predetermined position. The white standard board 12 is placed under the original scale 11 for correcting shades. During the scanning of an original, the first scanning body 5 and the second scanning body 8 move in a sub scanning direction due to a stepping motor (now shown in FIG. 1). The first scanning body 5 and the second scanning body 8 move under the contact glass 2 to expose the original by the exposing lamp 3. The light reflected off the original is reflected by the first reflection mirror 4, the second reflection mirror 6 and the third reflection mirror 7, and an image is formed on the CCD 9 through the lens unit 10. The above described components implement the image reading means or unit 1.

Figure 2:
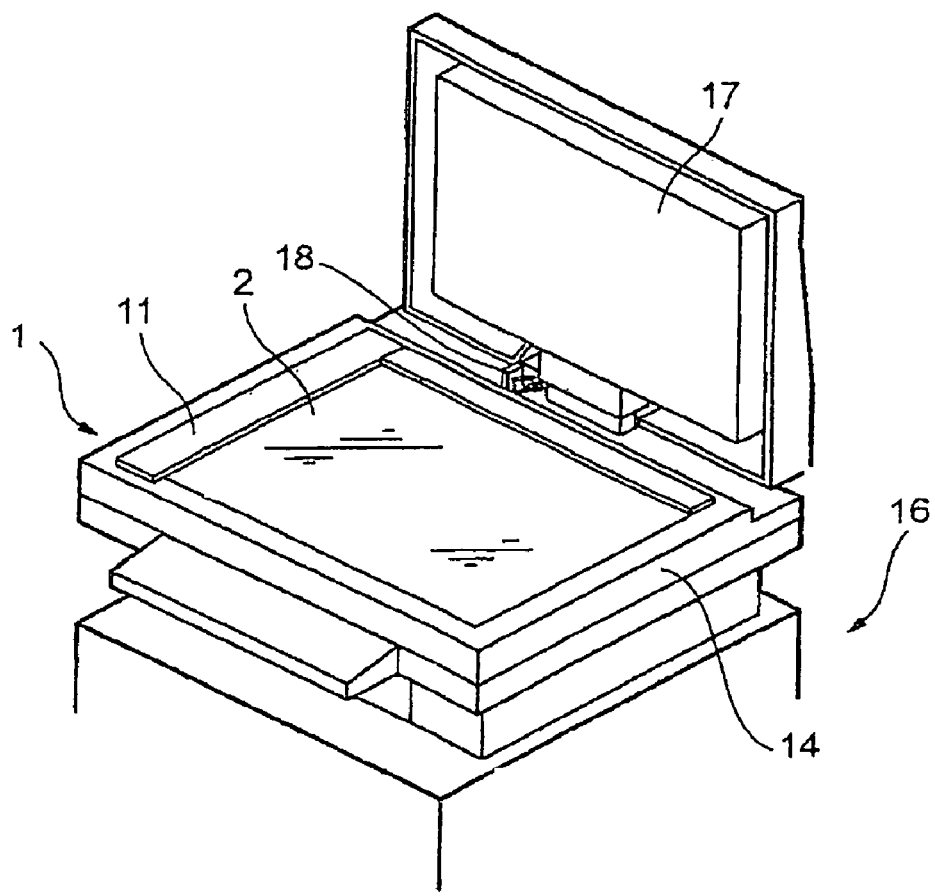
FIG. 2 is a diagram illustrating a prospective view of an upper portion of one preferred embodiment of the digital copier according to the current invention.

Now referring to FIG. 2, a diagram illustrates a prospective view of an upper portion of one preferred embodiment of the digital copier 16 according to the current invention. The scanner 1 as described with respect to FIG. 1 is installed in the digital copier 16, which also includes a printer (not shown in FIG. 2) for forming an image on a recording medium according to image data that is scanned by the scanner 1. For example, the above image formation is according to an electrophotographic method. The scanner 1 includes a press cover 17 that opens and closes over the contact glass 2. A sensor 18 detects the opening position and the closing position of the press cover 17. In addition to the electrophotographic method, the printer in the digital copier 16 utilizes various printing methods such as an ink jet method, a sublimation thermal transfer method, a silver halide photographic method, a direct thermal recording method and an indirect thermal transfer method. Since the details of these methods are prior art, they will not be reiterated.

Figure 3:
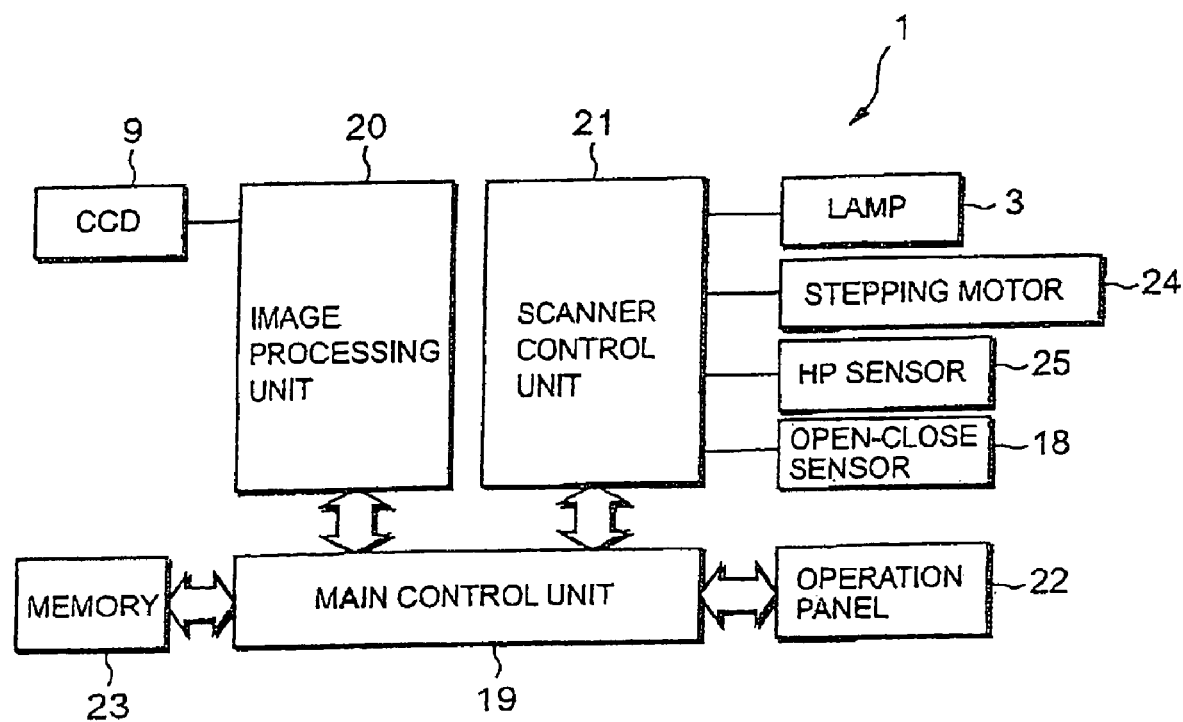
FIG. 3 is a block diagram illustrating electrical connections among the units in the scanner 1 of the preferred embodiment according to the current invention.

Now referring to FIG. 3, a block diagram illustrates electrical connections among the units in the scanner 1 of the preferred embodiment according to the current invention. A main control unit 19 controls the entire parts of the scanner 1. The main control 19 is connected to an image processing unit 20 for image processing the scanned data from the CCD 9, a scanner control unit 21 for controlling the first scanning body 5 and the second scanning body 8, an operation panel 22 for displaying messages and receiving various operation inputs for the digital copier 16, and a memory 23 for storing predetermined data and the scanned image data from the CCD 9. The operation panel 22 includes operational keys such as a start copy key for initiating a copying process. The scanner control unit 21 is connected to the exposing lamp 3, a stepping motor 24, a scanner home position sensor 25 and the open-close sensor 18. The stepping motor 24 drives the first scanning body 5 and the second scanning body 8. The scanner home position sensor 25 detects whether or not the first scanning body 5 and the second scanning body 8 are at a predetermined home position.

Figure 4:
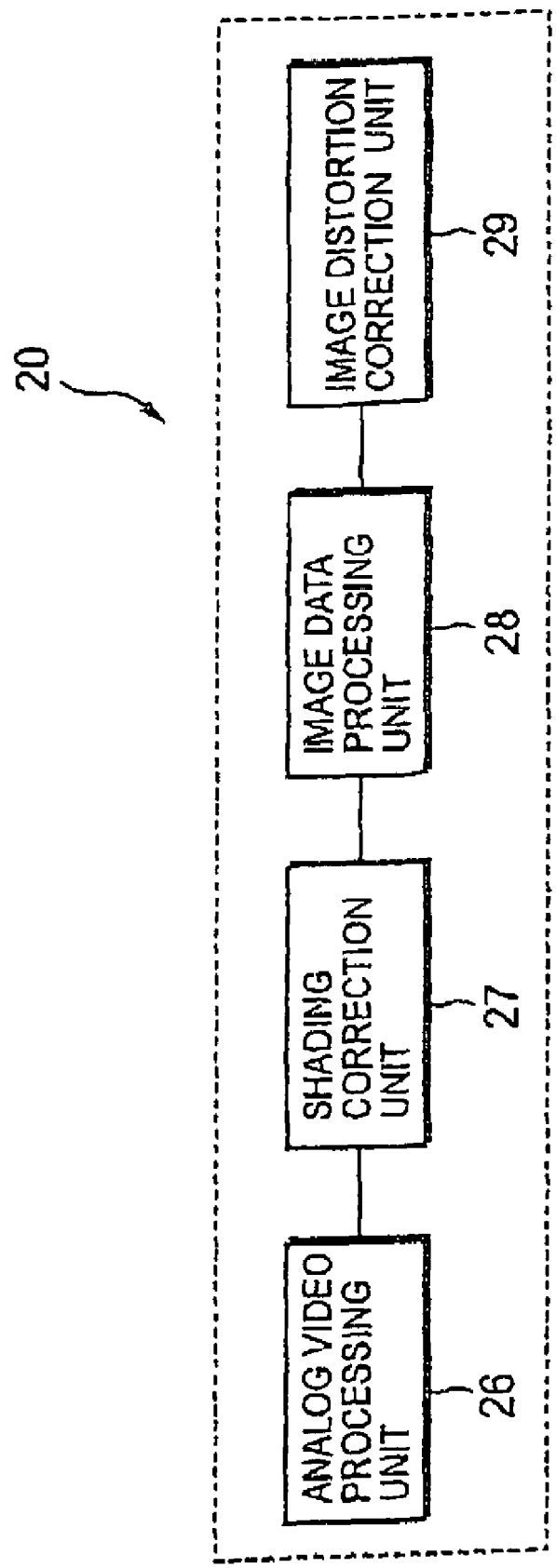
FIG. 4 is a block diagram illustrating basic components of the image processing unit of the preferred embodiment according to the current invention.

Now referring to FIG. 4, a block diagram illustrates basic components of the image processing unit 20 of the preferred embodiment according to the current invention. The image processing unit 20 further includes an analog video processing unit 26, a shading correction unit 27, an image data processing unit 28 and an image distortion correction unit 29. The analog video processing unit 26 performs a amplification process and a digital conversion process on analog image data from the CCD9. The shading correction unit 27 performs a shading correction process. After the shading process, the image data processing unit 28 performs various image data processes such as a MTF correction process, a variable size process and a γ correction process on the digital image signal. The image distortion correction unit 29 realizes a characteristic function of the preferred embodiment for correcting the distortions in the scanned image data. After the digital image signal has been image processed in the above described manner, the digital image signal is sent to the printer via the main control unit 19 for the image formation.

Figure 5:
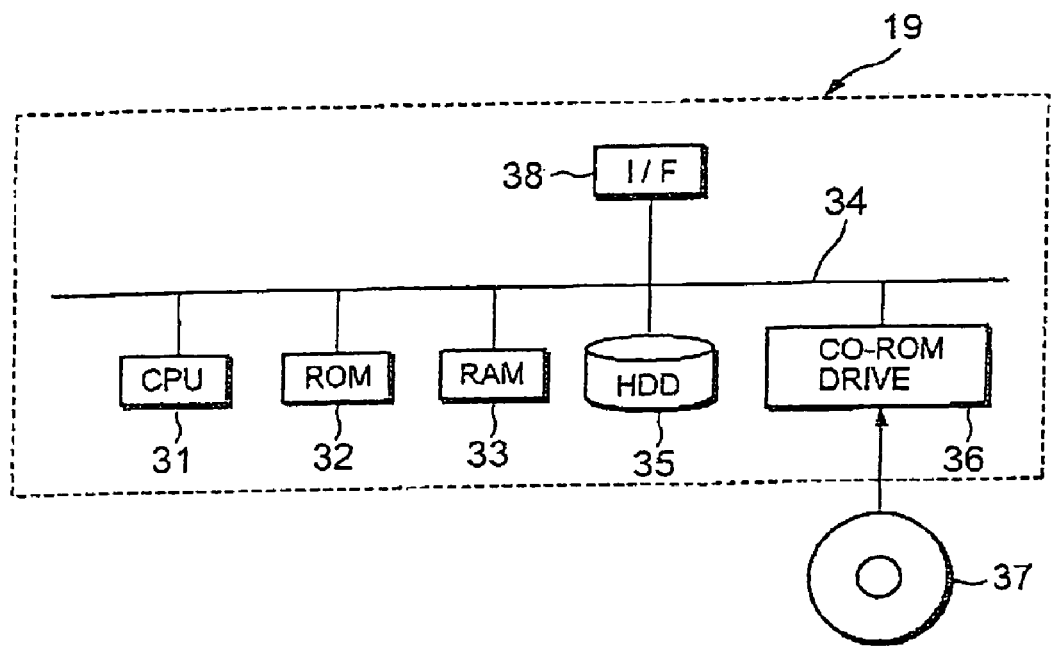
FIG. 5 is a block diagram illustrating basic components of the main control unit of the preferred embodiment according to the current invention.

Now referring to FIG. 5, a block diagram illustrates basic components of the main control unit 19 of the preferred embodiment according to the current invention. The main control unit 19 includes a central processing unit (CPU) 31 for centrally controlling various units. The CPU 31 is connected via a bus 34 to a read only memory (ROM) 32 for storing basic input output system (BIOS) and a random access memory (RAM) 33 for storing various data in an erasable manner to function as a work area. The above described components are a part of a micro computer. Furthermore, the bus 34 is connected to a hard disk drive (HDD) for storing a control program and a DD-ROM drive 36 for reading from a compact disk (CD)-ROM 37 and interface (I/F) 38 for communicating with a printer. The CD-ROM 37 implements a storage medium for storing a predetermined control software program according to the current invention. The CPU 31 reads the control program stored in the CD-ROM 37 via the CD-ROM drive 36 and installs it on the HDD 35. The main control unit 19 is thus enabled to perform various processes that will be later described. The recording media are not limited to the CD-ROM 37 and include various media such as optical disks such as DVD, various opto-magnetic disks, various magnetic disks such as floppy disks and semiconductor memory. Furthermore, a software program is downloaded from the network such as the Internet and is stalled in the HDD 35. In the above downloading situation, a storage device for storing the software program in the transmitting server side is also a recording medium according to the current invention. The software program operates on a predetermined operating system (OS), and a part of the later described processes may be performed by the OS. Alternatively, the software program is included as a part in a group of files that implement an application software program such as a word processing program or an OS.

The CPU 31 in the main control unit 19 performs various processes according to the control program. Among the processes that the CPU 31 performs, the following will be limited to the characteristic process of correcting distortions in the scanned image data by the image distortion correction unit 29. The characteristic correction function resides in the scanner 1 in the preferred embodiment according to the current invention.

Figure 6:
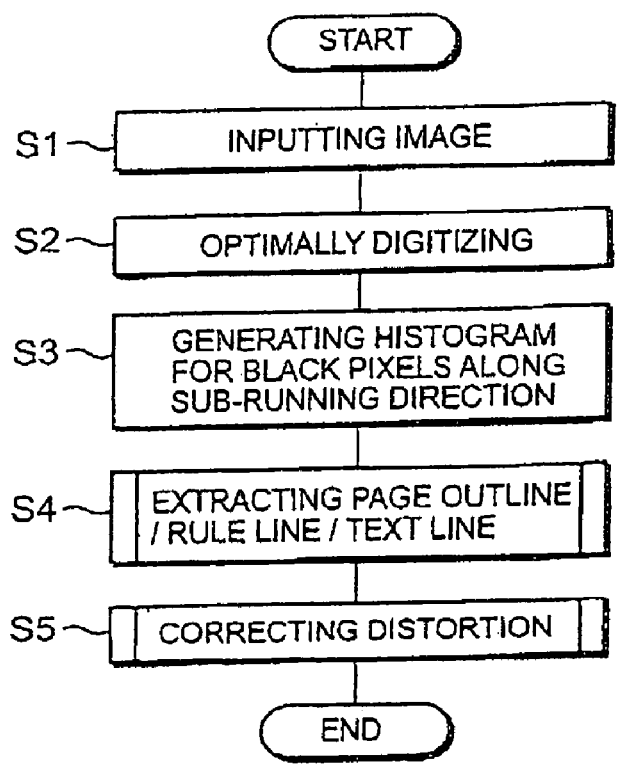
FIG. 6 is a flow chart illustrating steps involved in a preferred process of correcting the distortions in the scanned image data according to the current invention.
Figure 7:
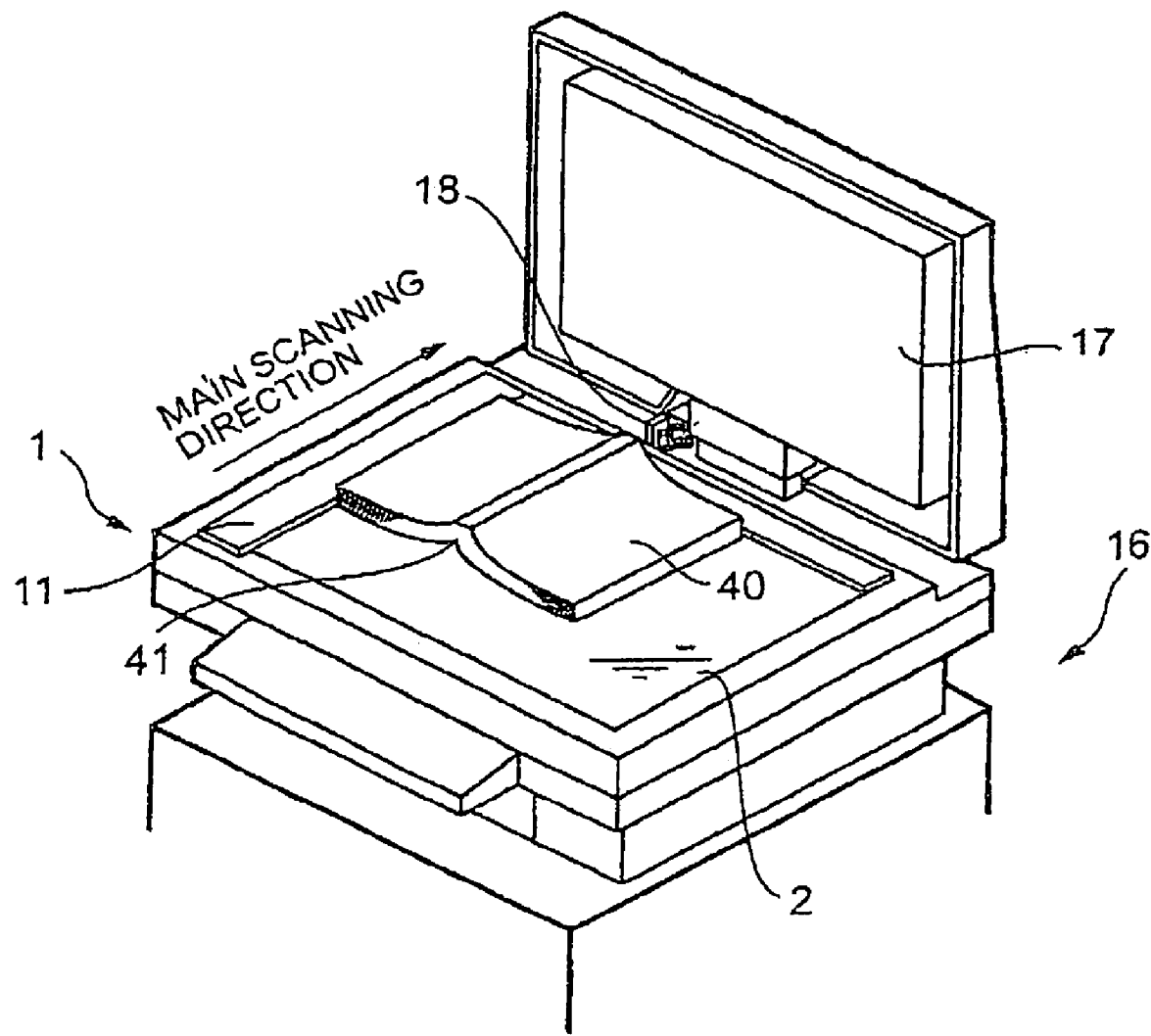
FIG. 7 is a perspective view of the image scanner on which the page bound portion of the book is placed on the contact glass in parallel to the main scanning direction as indicated by an arrow.
Figure 8:
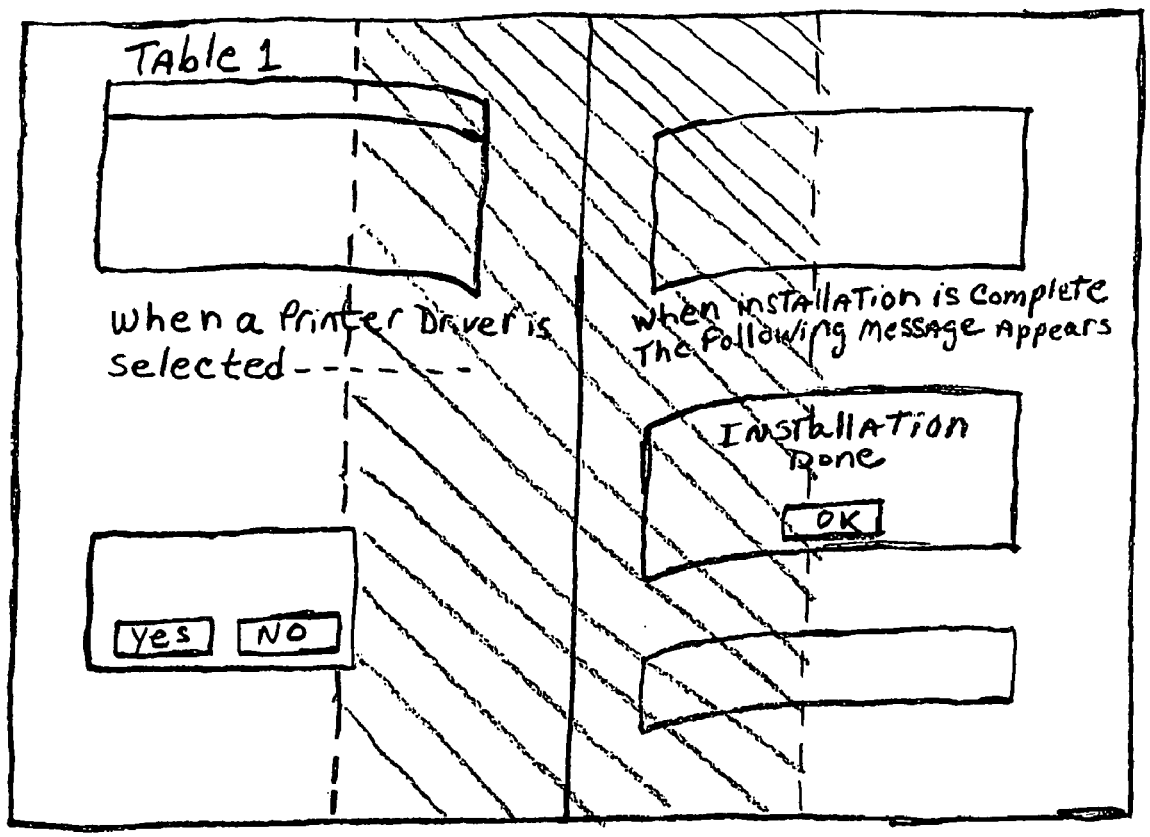
FIG. 8 is one example of the inputted image to be corrected according the current invention.
Figure 9:
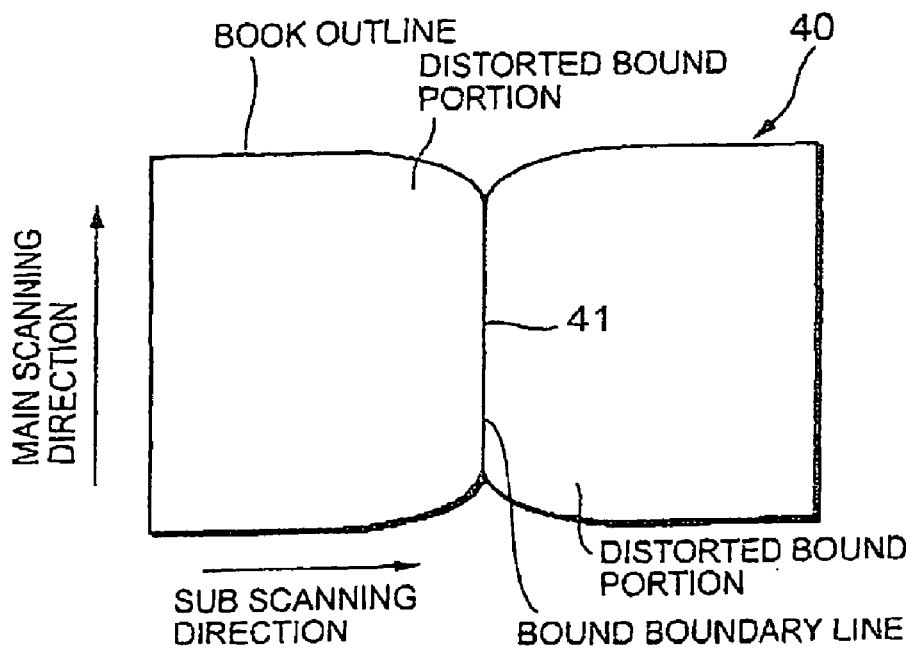
FIG. 9 is a diagram illustrating the scanned image of the book with distortion near the bound portion.
Figure 10:
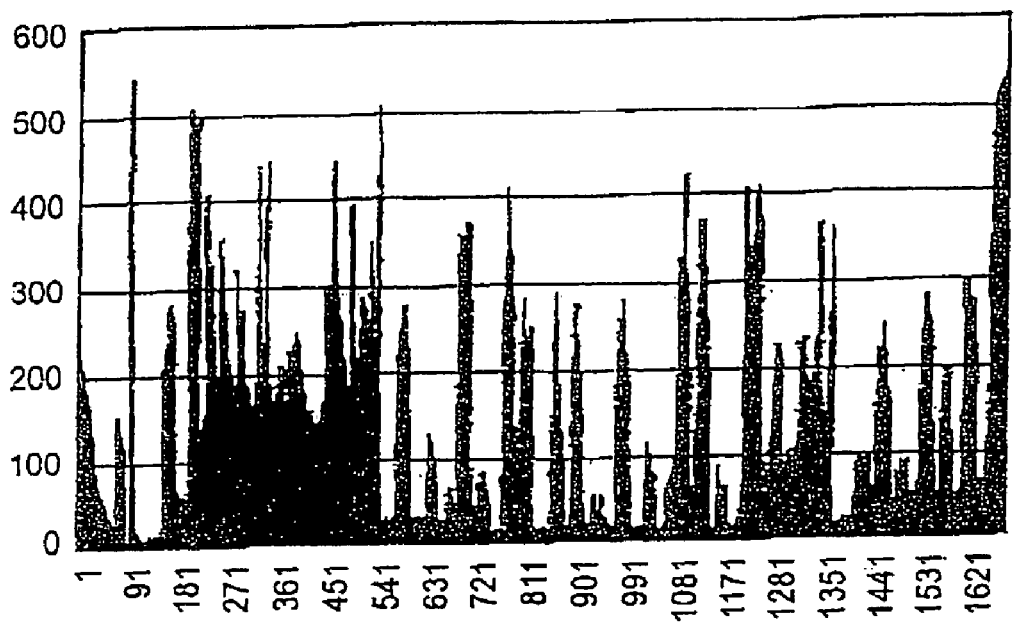
FIG. 10 is a histogram illustrating the distribution of the black pixels in the image data that is from the left portion to the boundary portion of the book image data as shown in FIG. 8.

FIG. 6 is a flow chart illustrating steps involving in a preferred process of correcting the distortions in the scanned image data according to the current invention. In the preferred process, as shown in FIG. 7, it is assumed that the page bound portion 41 of the book 40 is placed on the contact glass 2 in parallel to the main scanning direction of the scanner 1 as indicated by an arrow. Prior to a step S1, the scanned image data of the book 40 on the contact glass 2 is outputted from the image data processing unit 28. In the step S1, the processed scanned image is inputted for further processing. One example of the inputted image is shown in FIG. 8. The scanned image of the input book 40 has distortion near the bound portion 41 as illustrated in FIG. 9. In a step S2, an optimal digitizing process is performed on the scanned image data of the book 40 such as monochro multi-valued image data. In a step S3, a histogram is generated for a number of black pixels in a sub scanning direction. The black pixel is defined to have a pixel value above a predetermined pixel value. A histogram as shown in FIG. 10 illustrates the distribution of the black pixels in the image data that is from the left portion of the boundary portion of the book image data as previously shown in FIG. 8. The x axis of the histogram in FIG. 10 indicates the position of the black pixels in the sub scanning direction while the y axis indicates a number of the pixel for each location. The position for a pixel having the highest density value along the sub scanning direction is selected for the bound portion. The digitization process for the scanned image having multi-value color image data focuses upon one of the primitive colors such as red (R), green (G) or blue (B). For example, if G is selected, a black pixel is defined as a G value is over a predetermined threshold value while a white pixel is defined as a G value is below the predetermined threshold value. Alternatively, RGB is color converted to a chromatic portion and a luminance portion, and the luminance portion is used for the threshold comparison process. An extraction process is performed in a step S4 to extract page outlines, rule lines and character lines from the scanned image data. Finally, the based upon the results from the step S4, the distortions in the scanned image is corrected in a step S5.

Figure 11:
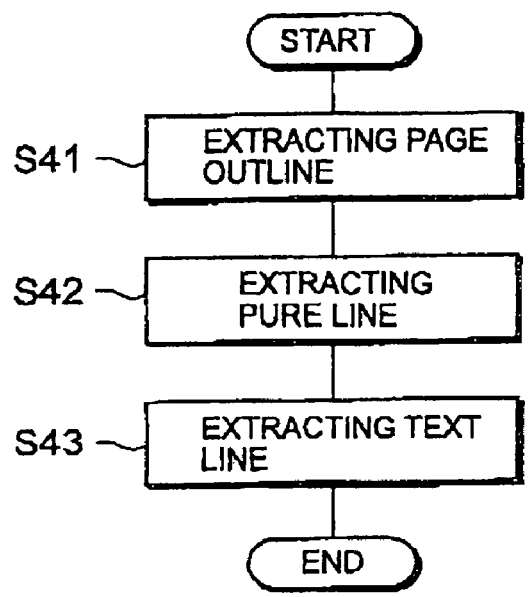
FIG. 11 is a flow chart illustrating further steps involved in the above step of extracting page outlines, rule lines and character lines in a preferred process of correcting the distortions in the scanned image data according to the current invention.
Figure 12:
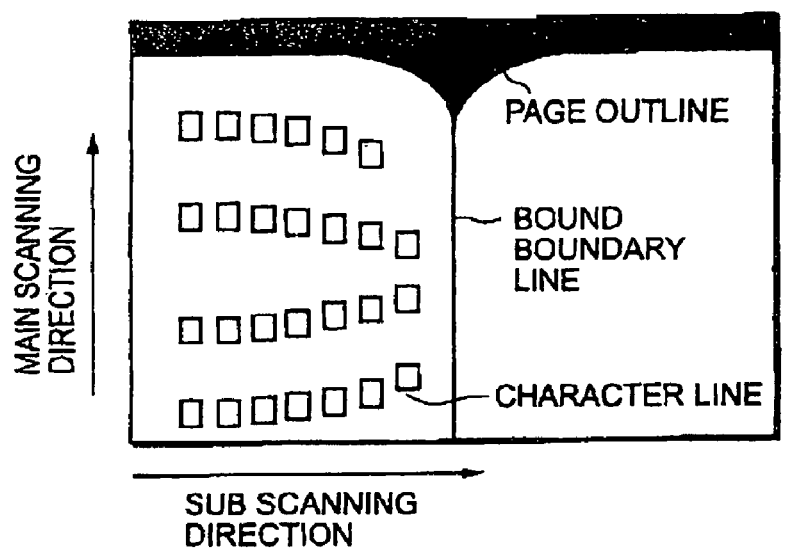
FIG. 12 is an exemplary situation where a page outline exists at an upper end in the scanned image.
Figure 13:
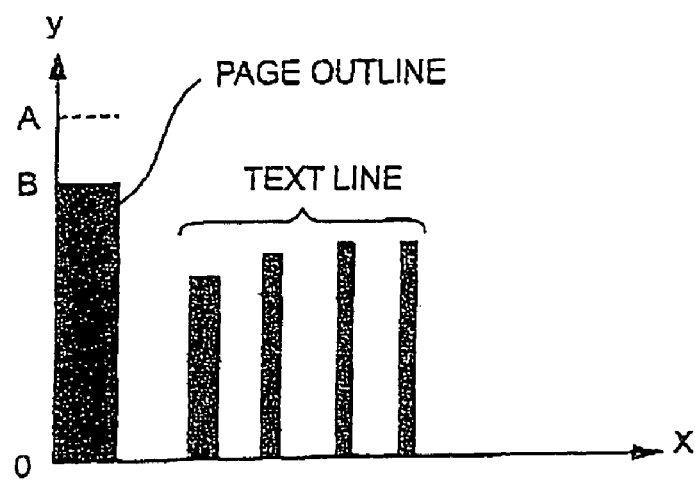
FIG. 13 is a histogram for the black pixel distribution in the left side of the boundary portion of the scanned image as shown in FIG. 12.

Now referring to FIG. 11, a flow chart illustrates further steps involved in the above step 4 of extracting page outlines, rule lines and character lines in a preferred process of correcting the distortions in the scanned image data according to the current invention. In a step S41, a page outline is extracted from the scanned image data. The page outline extraction process is described with respect to FIGS. 12 and 13. FIG. 12 is an exemplary situation where a page outline exists at an upper end in the scanned image. FIG. 13 is a histogram for the black pixel distribution in the left side of the boundary portion of the scanned image as shown in FIG. 12. The x axis in FIG. 13 corresponds to the main scanning direction as shown in the vertical direction in FIG. 12, and the upper end of the scanned image corresponds to the left edge in the histogram. Contrarily, if the page outline exists at the lower end of the scanned image, the lower portion corresponds to the right edge in the histogram. As shown in FIG. 12, since the page outline exists at an upper end in the scanned image, a black band appears in the upper portion of the scanned image. Correspondingly, a high bar exists at the left side of the histogram as shown in FIG. 13. In the step 41, it is determined whether or not a page outline exists in the scanned image based upon the above described characteristics of the histogram.

More concretely, as shown in the y axis in FIG. 13, the distance A0 indicates the distance between the left edge of the scanned image and the boundary line in the bound portion. The ratio between the distance A0 and the histogram height B0 is expressed in the following equation:

$$k = \frac{B0}{A0} \quad (1)$$

If the calculated ratio k is larger than a predetermined threshold value, it is determined that a page outline exists in the scanned image. When a page outline exists at the top or bottom of the scanned image, since a relatively high histogram bar exists at the left or right edge of the histogram, it is determined whether or not a page outline exists in the scanned image based upon the histogram bar height at the right or left edge of the histogram. The page outline determination function is thus implemented. When it is determined that a page outline exists, in addition to the information on the relative location of the page outline such as top, bottom, right or left, the page outline is extracted and is temporarily stored in each of the right and left pages of the boundary line in the bound portion. If the page outline is found at the top and bottom of the right and left pages, the steps 42 and 43 are not performed.

Figure 14:
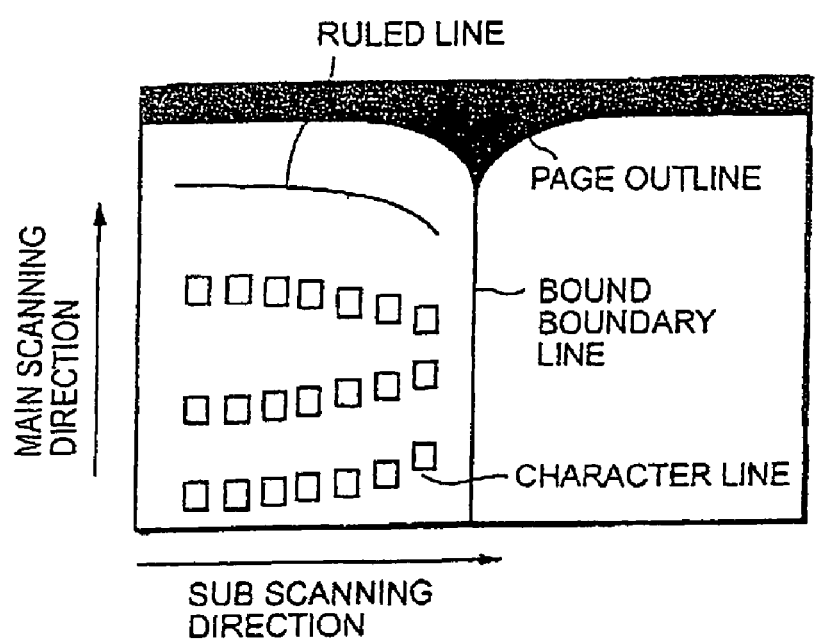
FIG. 14 is an exemplary situation where a rule line exists in a left upper area in the scanned image.
Figure 15:
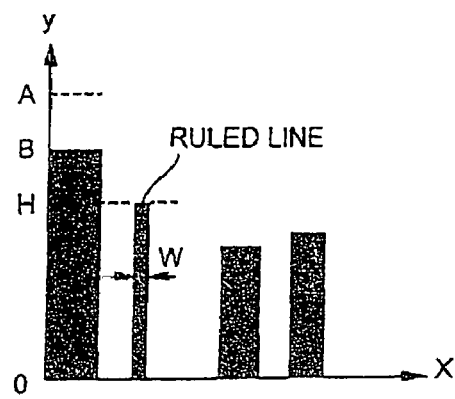
FIG. 15 is a histogram for the black pixel distribution in the left side of the boundary portion of the scanned image as shown in FIG. 14.

Referring back to FIG. 11, in a step S42, a rule line is extracted from the scanned image. The rule line extraction process is described with respect to FIGS. 14 and 15. FIG. 14 is an exemplary situation where a rule line exists in a left upper area in the scanned image. FIG. 15 is a histogram for the black pixel distribution in the left side of the boundary portion of the scanned image as shown in FIG. 14. The x axis in FIG. 15 corresponds to the main scanning direction as shown in the vertical direction in FIG. 14, and the upper end of the scanned image corresponds to the left edge in the histogram. Since the rule exists at a left upper area in the scanned image, a narrow black band appears in the histogram in FIG. 15. In the step 42, it is determined whether or not a rule line exists in the scanned image based upon the above described characteristics of the histogram.

Figure 16:
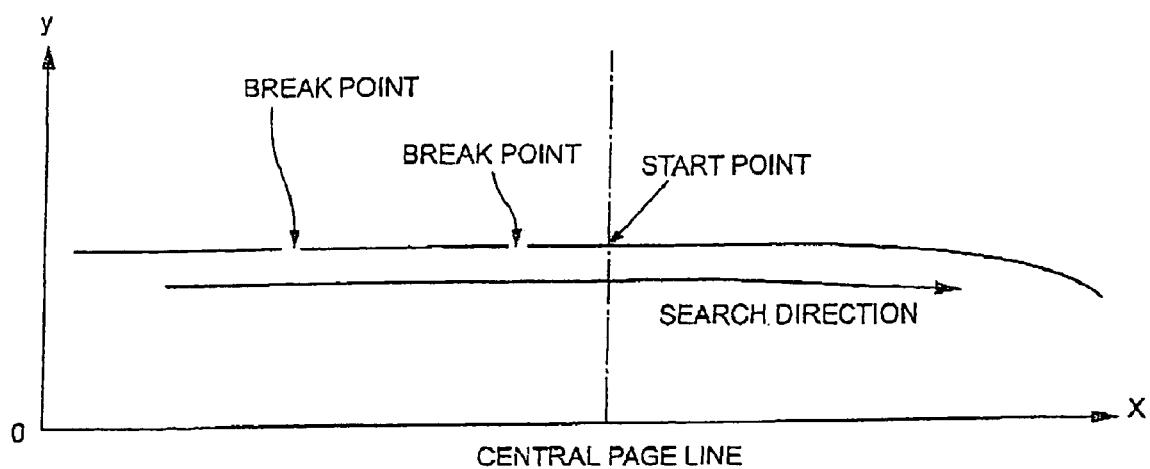
FIG. 16 is a diagram illustrating breaks on the candidate rule line

More concretely, as shown in the y axis in FIG. 15, the height H indicates the height of the narrow banded histogram bar that reflects the rule line. At the center of the histogram height H or ½ of the height, a width W is determined. It is determined whether or not the histogram bar indicates a rule line based upon the height H and the width W. If the height exceeds a predetermined threshold value thH and the width W is smaller than a predetermined threshold value thW, it is determined that the scanned image contains a rule line candidate at the specified peak. The rule line candidate is further examined for its continuity. As shown in FIG. 16, a desirable point such as a center on the candidate rule line is selected as a start point. From the start point, the candidate rule line is searched in the right and left directions for any breaks where the rule is not continuous, and the number of the breaks is counted for the candidate rule line. If the number of the breaks is smaller than a predetermined threshold value, the candidate rule line is now considered to be a rule line. By further examining the continuity of the rule line candidate, it is possible to eliminate any erroneously selected dotted line or character line containing small characters from the rule lines. The rule line determination function is thus implemented. After the rule lines are determined, a set of coordinates is detected for each of the rule lines.

Figure 17:
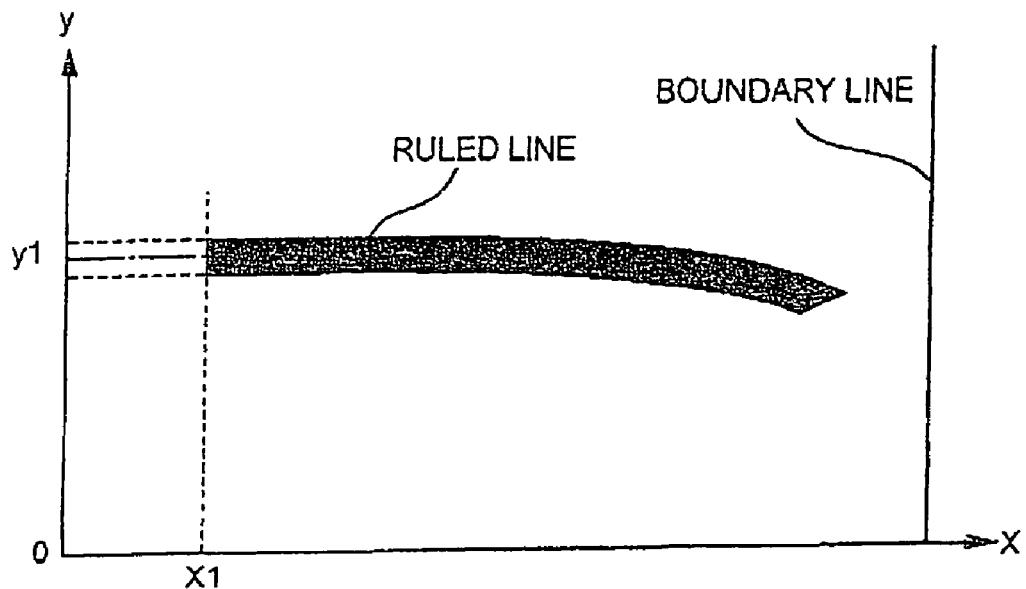
FIG. 17 is a graph indicating an exemplary position of an optimal rule line with respect to the main and sub scanning directions.
Figure 18:
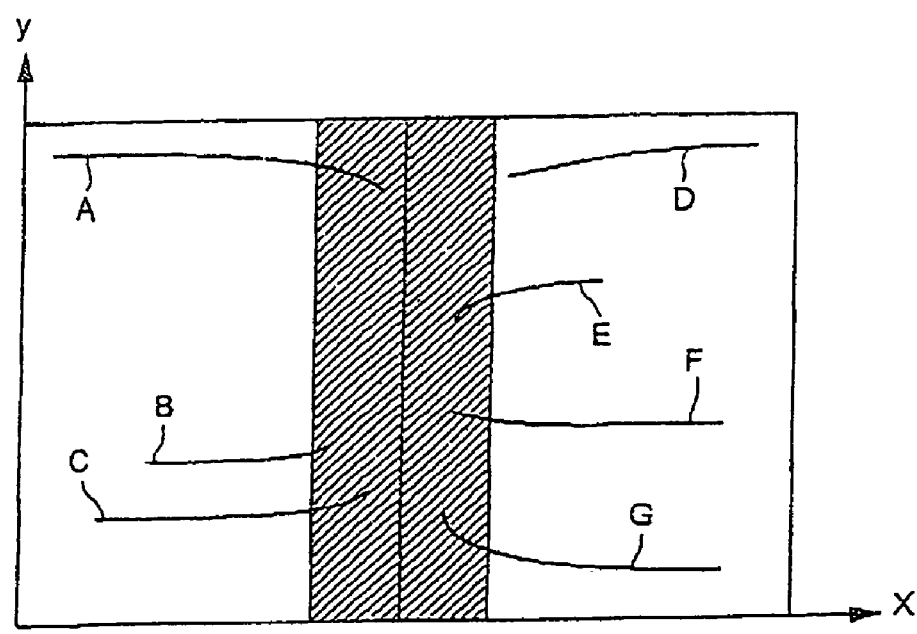
FIG. 18 is a diagram indicating a plurality of the rule line candidates from which an optimal rule line is selected for the distortion correction.

Now referring to FIG. 17, a graph indicates an exemplary position of an optimal rule line with respect to the main and sub scanning directions. After an optimal rule line is selected to be used for the correction of distortions in the scanned image, the y coordinate of the rule line is a central position y1 of the black pixel band or run along the main scanning direction or the y axis at the x coordinate at x1. As shown in FIG. 18, when a plurality of the rule lines exists, it is necessary to select an optimal rule line from a plurality of the rule lines for the distortion correction. One exemplary selection standard includes a combination of the length of the rule line as determined by a threshold value and the position of the rule line with respect to the bound portion. That is, the optimal rule line should be longer than a predetermined threshold and is located within a predetermined distance from the boundary line in the bound portion. Furthermore, another additional condition is that the rule line is the closest to the page outline at the top or bottom. Based upon the above described criteria, among the rule lines A through G as shown in FIG. 18, one optimal rule line is selected for the right page and the left page. In the right page, a rule line G is selected as optimal among rule lines D through G since the rule line G is 1) longer than a predetermined threshold length, 2) partially overlapping in the predetermined bound portion as indicated by a shaded area, and 3) closest to the page outline at the bottom. Similarly, in the left page of the scanned image, a rule line A is selected as an optimal line among rule lines A through C since the rule line A is ) longer than a predetermined threshold length, 2) partially overlapping in a predetermined bound portion as indicated by a shaded area, and 3) closest to the page outline at the top.

Figure 19:
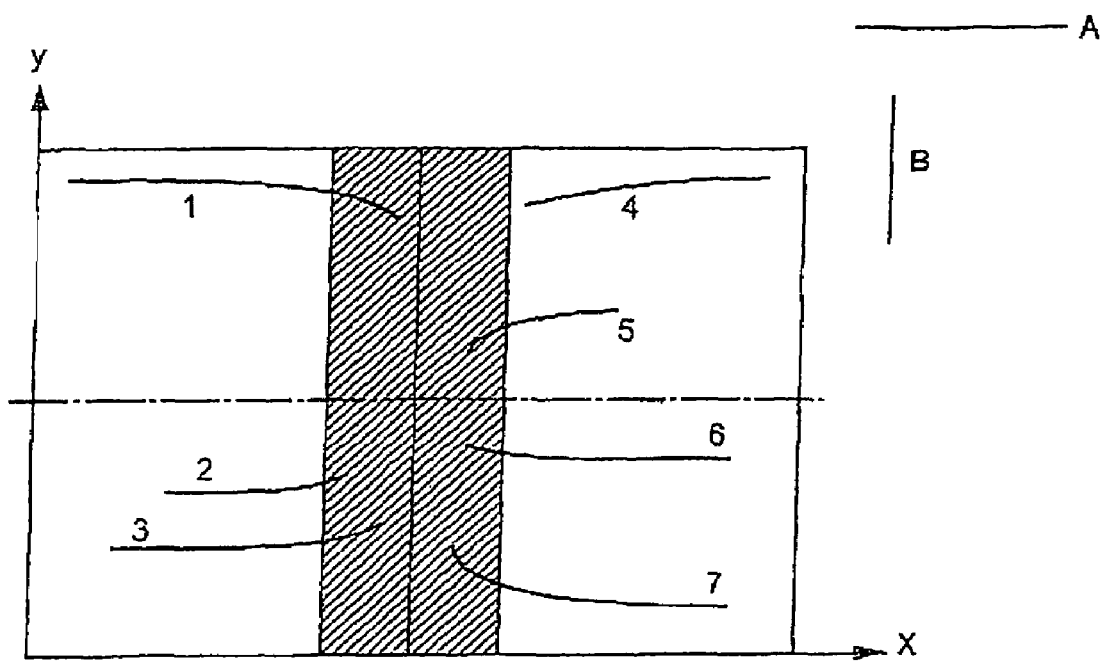
FIG. 19 is another exemplary set of selection criteria for an optimal rule line including a predetermined length A and an overlap with a predetermined bound portion as indicated in an shaded area in combination with a predetermined distance B from the top or bottom of the page outline.

Alternatively, referring to FIG. 19, another exemplary set of selection criteria for an optimal rule line includes a predetermined length A and an overlap with a predetermined bound portion as indicated in an shaded area in combination with a predetermined distance B from the top or bottom of the page outline. The alternative exemplary selection criteria allow the selection of up to two optimal rule lines per page. As shown in FIG. 19, the scanned image is divided into four blocks, and one optimal rule line can be selected within each of the four blocks. In the upper left block, a rule line 1 satisfies the alternative selection criteria. Similarly, a rule line 3 and a rule line 7 are selected respectively for the lower left block and the lower right block. However, in the upper right block, neither of rule lines 4 and 5 satisfies all of the three selection criteria, and no rule line is selected as an optimal rule line. The rule line 4 fails to overlap with the bound portion while the rule line 5 fails to be within a predetermined distance B from the top of the page outline. Yet another exemplary set of the selection criteria includes either a predetermined length A or an overlap with a predetermined bound portion as indicated in a shaded area. An alternative selection standard also includes the largest bend or distortion of a rule line in stead of the requirement for being the closest to the page outline. The amount of the distortion or bend is expressed by a difference in the Y coordinate or the main scanning direction between the right and left ends of the rule line.

Figure 20:
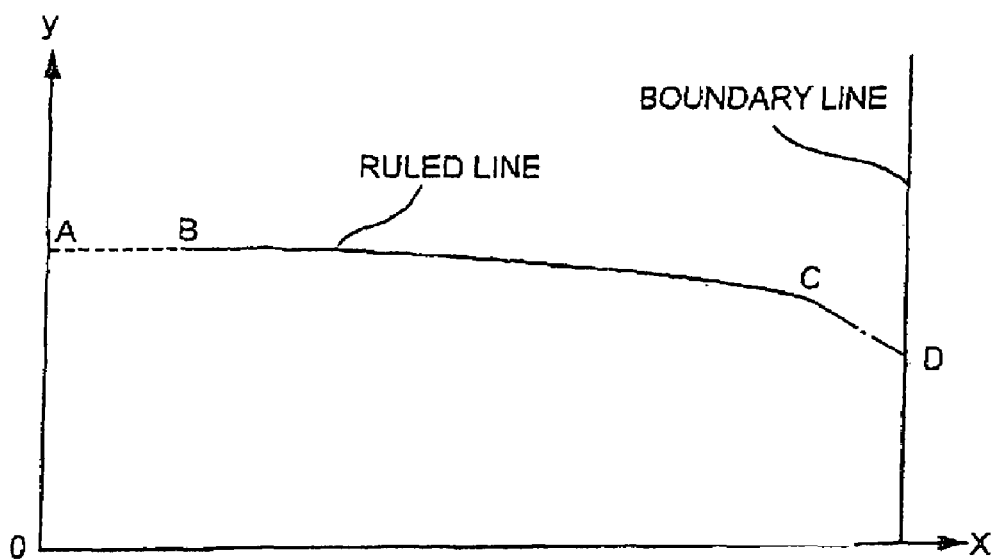
FIG. 20 is a diagram illustrating a rule line portion B-C whose coordinates have been already established as described with respect to FIG. 17.

After the optimal rule line is selected, the main scanning coordinates of the selected optimal rule line are determined by approximating the extension of the selected rule line to the left and right pages. As shown in FIG. 20, for a rule line portion B-C, the coordinates have been already established as described with respect to FIG. 17. For the approximated extensions A-B and C-D, the coordinates are determined in the main scanning direction or the y coordinates. For the extension A-B, the y coordinate is determined by a line approximation. For the extension C-D, the y coordinate is determined by a polynomial curve approximation.

Figure 21:
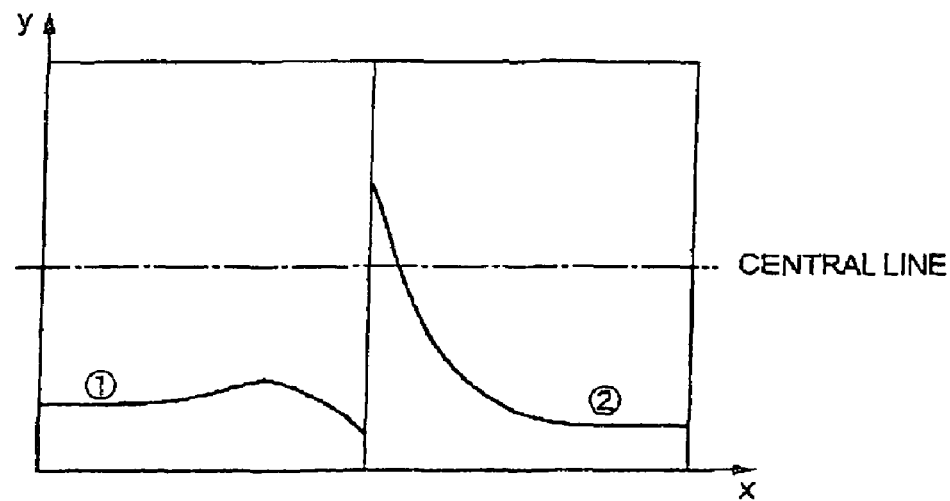
FIG. 21 is an exemplary diagram for illustrating undesirable approximated curves.

Lastly, inappropriately selected rule lines are eliminated. When the coordinates are approximated by a polynomial equation, if the approximated curve has an undesirable shape, the distortion may be amplified during the correction process. For the above fear, the rule lines with the undesirable curve are eliminated. Examples of the undesirable approximated curve are shown in FIG. 21. A curve 1 has a curve shape that bent towards the outside of the book while a curve 2 has a curve that exceeds the central line and cuts inside. If a rule line is eliminated due to the above described inappropriate curve shape, an optimal rule line is further selected by repeating the above described steps. By the above described processes, when it is determined that a rule line exists in the scanned image, the rule line is extracted, and the information on the existence of the rule line on the right or left page and the extracted rule line is temporarily stored in the RAM 33.

Figure 22:
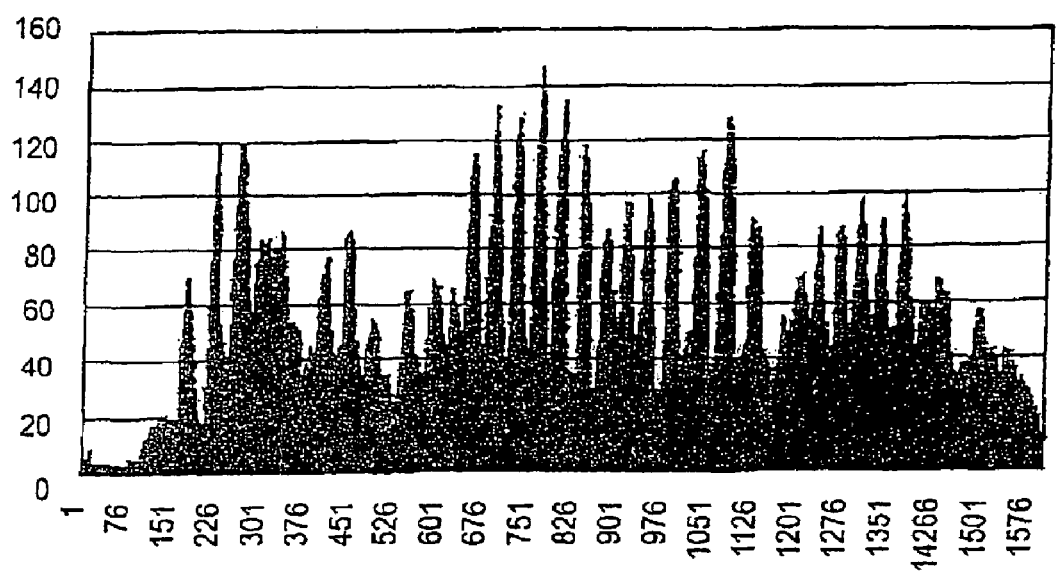
FIG. 22 is a histogram for an image that has been reversed in the sub scanning direction from one as shown in FIG. 8.
Figure 23:
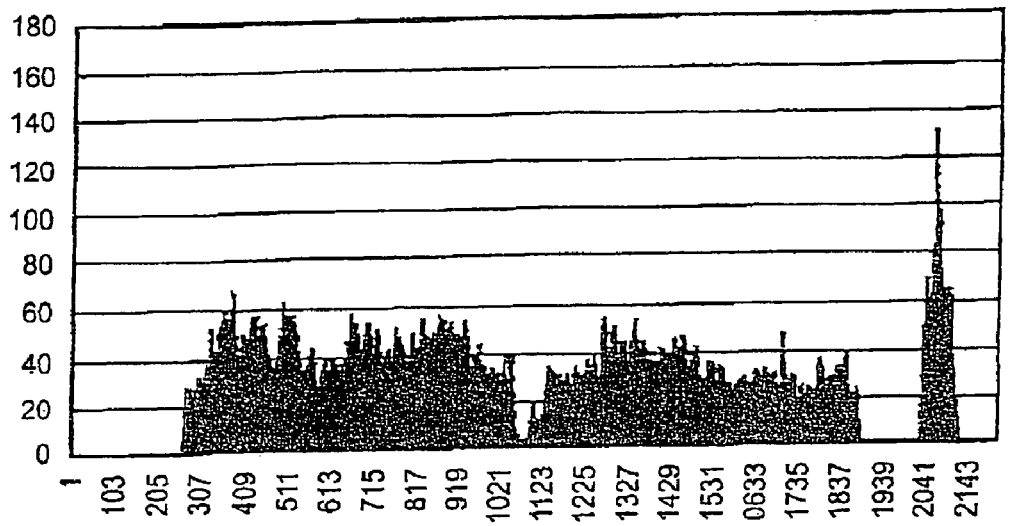
FIG. 23 is a histogram for an image that has been reversed in the main scanning direction from one as shown in FIG. 8.

Referring back to FIG. 11, in a step S43, a character line is extracted from the scanned image. It is initially determined whether a character is vertical or horizontal. As shown in FIG. 22, a histogram indicates a distribution of black pixels in the reversed scanned image data, whose original image is shown in FIG. 8. In FIG. 22, the x axis indicates the main scanning position of a pixel in the sub scanning direction in the scanned image while the y axis is a number of black pixels at a corresponding x position. In FIG. 23, the x axis indicates the sub scanning position of a pixel in the main scanning direction in the scanned image while the y axis is a number of black pixels at a corresponding x position. The black pixel is defined to be a pixel whose value is larger than a predetermined threshold value after the pixels have been reversed. For the scanned image as shown in FIG. 8, the histogram in the sub scanning direction significantly changes as shown in FIG. 22 while the histogram in the main scanning direction does not significantly change as shown in FIG. 23. In contrast, although not shown in figures, when the character lines are vertical in a scanned image, the histogram in the main scanning direction significantly changes while the histogram in the sub scanning direction does not significantly change. The above described determination for the character line orientation is more concretely described in the following equations. The following equation (2), $$mean_H = \frac{\sum_{y=0}^{height-1} Pnt(y)}{height} \quad (2)$$

The average value $mean_H$ of the histogram value Pnt(y) at a main scanning position y is determined, where H is a height of the image. According to the following equation (3), $$\sigma_H = \frac{\sum_{y=0}^{height-1} (Pnt(y) - mean_H)^2}{height} \quad (3)$$

The distribution $\sigma_H$ is obtained in the main scanning direction of the histogram in the sub scanning direction. Similarly, according to the equation (4), $$mean_v = \frac{\sum_{x=0}^{width-1} Pnt(x)}{width} \quad (4)$$

The average value $mean_V$ of the histogram value Pnt(x) at a sub scanning position x is determined, where width is a width of the image. According to the following equation (5), $$\sigma_v = \frac{\sum_{x=0}^{width-1} (Pnt(x) - mean_v)^2}{width} \quad (5)$$

The distribution $\sigma_V$ is obtained in the sub scanning direction of the histogram in the main scanning direction.

As already described above, if the character line in the scanned image is horizontal, the distribution $\sigma_H$ in the main scanning direction of the histogram in the sub scanning direction is larger than the distribution $\sigma_V$ in the sub scanning direction of the histogram in the main scanning direction. In contrast, if the character line in the scanned image is vertical, the distribution $\sigma_V$ in the sub scanning direction of the histogram in the main scanning direction is larger than the distribution $\sigma_H$ in the main scanning direction of the histogram in the sub scanning direction. In other words, based upon the comparison of the distributions $\sigma_H$ and $\sigma_V$, it is possible to determine the orientation of the character line. In deciding whether the character line is horizontal or vertical, the black-to-white reversed histogram was used to avoid the confusion between the character lines and the photographic portions. In general, when the black histogram values are approximately similar, the character areas will have larger values than the photographic areas after the pixel reversal. The above described processes implement the function of character determination.

Figure 24:
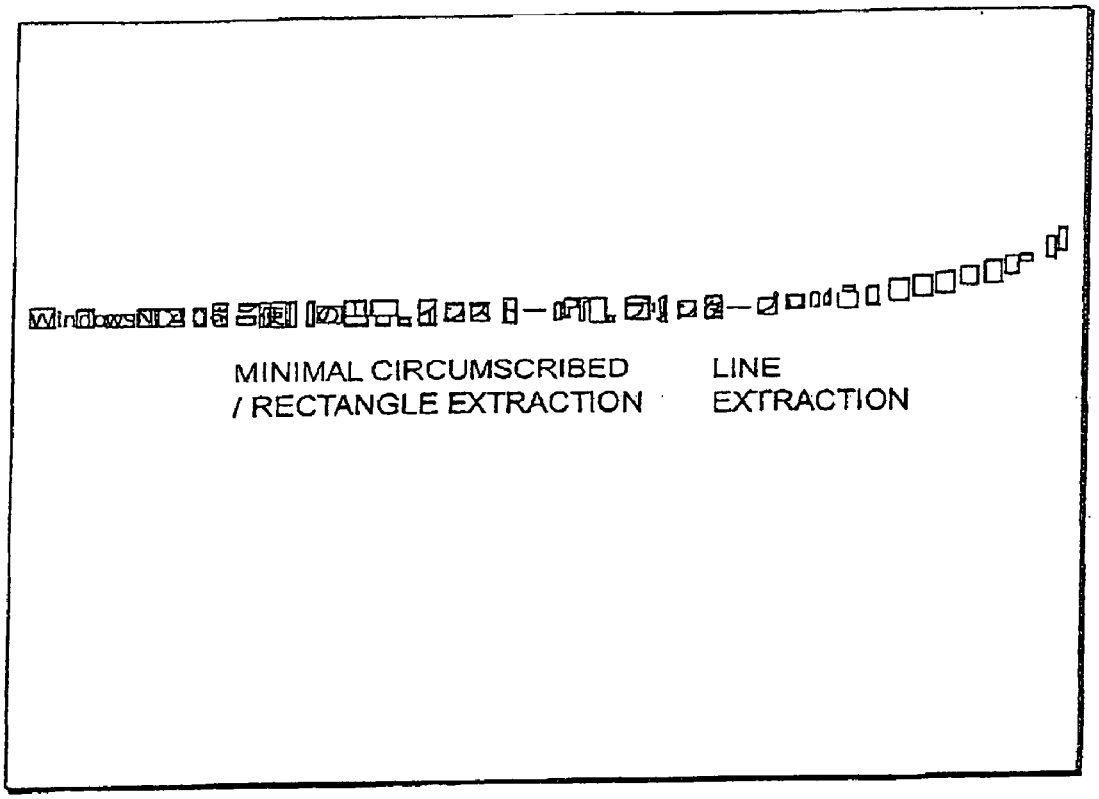
FIG. 24 is a diagram illustrating one exemplary result of a minimal circumscribed rectangle extraction process and a character line extraction according to the current invention.
Figure 25:
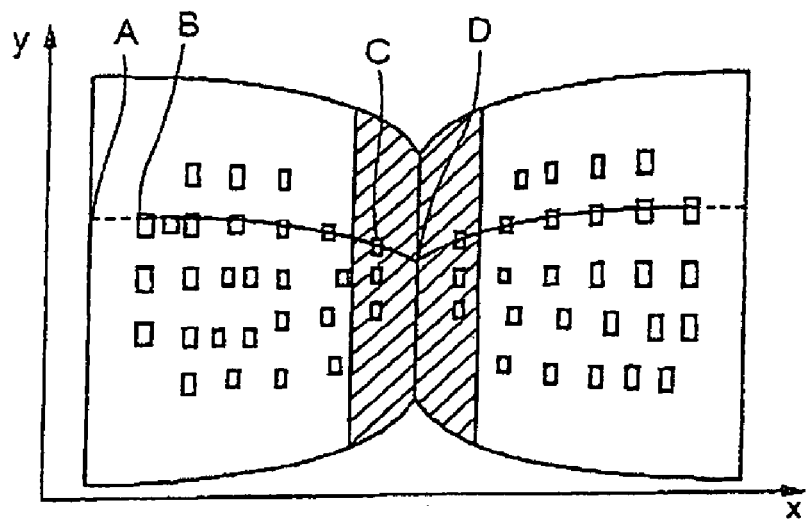
FIG. 25 is a diagram illustrating a character line in a sub scanning direction.

After the character lines are determined in the above described manner, to determine the coordinates of the horizontal character line, a minimally circumscribed rectangle is initially extracted for each character in the horizontal character line. Since the character recognition is prior art, the corresponding description will not be reiterated. One exemplary result of a minimal circumscribed rectangle extraction process and a character line extraction process is illustrated in FIG. 24. The central point of each of the minimal circumscribing rectangle is considered to be a corresponding pair of coordinates of the character. Thus, the horizontal character line coordinates are determined. Among the above extracted horizontal character lines, an optimal horizontal character line is selected for the distortion correction. It is necessary to determine an optimal horizontal character line from a plurality of the horizontal character lines. One exemplary selection standard is substantially identical to that for selecting an optimal rule line. As shown in FIG. 25, the length of a horizontal character line BC is longer than a predetermined length, and a part of the horizontal character line BC overlaps a predetermined width of the bound portion as indicated by a shaded area. A point B resides on a center of the most left minimal circumscribing rectangle in the character line while a C resides on a center of the most right minimal circumscribing rectangle in the same character line. Furthermore, the exemplary selection standard additionally requires that an optimal horizontal character line is the closest to the top or bottom of the page outline. As described above with respect to the selection of the optimal rule line, one optimal character line is selected from the character line that is closest to the page outline in the left page as well as from right page. Alternatively, one optimal character line is selected from the character line that is closest to the page outline in each of the quadrants of the scanned image. Yet another exemplary set of the selection criteria includes either a predetermined length or an overlap with a predetermined bound portion as indicated in a shaded area. An alternative selection standard also includes the largest bend or distortion of a character line in stead of the requirement for being the closest to the page outline. The amount of the distortion or bend is expressed by a difference in the Y coordinate or the main scanning direction between the central coordinate of the most right and left minimal circumscribing rectangles of the character line.

After the optimal character line is selected, the main scanning coordinates of the selected optimal character line are determined by approximating the extension of the line of the central points of the minimal circumscribing rectangles of the selected character line to the left and right pages. As shown in FIG. 25, the line D is a boundary line. For the extension A-B, the y coordinate is determined by a line approximation. For the extension B-D, the y coordinate is determined by a polynomial curve approximation.

Lastly, inappropriately selected horizontal character lines are eliminated. When the coordinates are approximated by a polynomial equation, if the approximated curve has an undesirable shape, the distortion may be amplified during the correction process. For the above fear, the horizontal character lines with the undesirable curve are eliminated. The undesirable approximated curves are not illustrated, but they have substantially the same characteristics. For example, a curve is bent towards the outside of the book or exceeds the central line and cuts inside. If a horizontal character line is eliminated due to the above described inappropriate curve shape, an optimal horizontal character line is further selected by repeating the above described steps. By the above described processes, when it is determined that a horizontal character line exists in the scanned image, the horizontal character line is extracted, and the information on the existence of the horizontal character line on the right or left page and the extracted horizontal character line is temporarily stored in the RAM 33.

Figure 26:
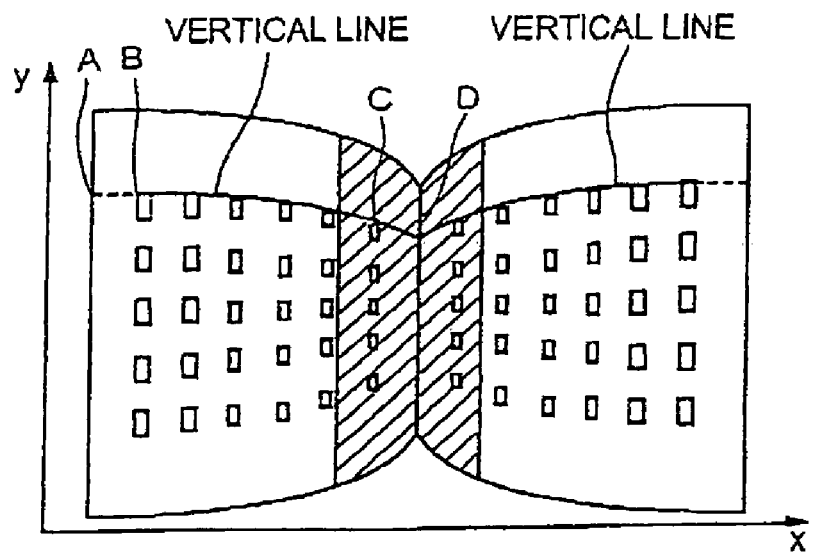
FIG. 26 is a diagram illustrating a character line in a main scanning direction.

When the characters are placed in the vertical directions, the following procedure is performed to select an optimal horizontal line character to be used for the distortion correction. In other words, a horizontal character line is constructed from the vertical character lines for the purpose of the distortion correction since the vertical character lines do not easily indicate the amount of the relevant distortion. To determine the coordinates of the vertical character line, a minimally circumscribed rectangle is initially extracted for each character in the vertical character line. Since the character recognition is prior art, the corresponding description will not be reiterated. The central point of each of the minimal circumscribing rectangle is considered to be a corresponding pair of coordinates of the character. Thus, the vertical character line coordinates are determined. Among the vertical character lines, a horizontal character line is constructed and extracted. The horizontal line is extracted from the most upper line containing the top character of each vertical line. When a single horizontally constructed character line is extracted from each of the right and left page of the scanned image, the most upper or lower character row is extracted from a page. When each page is blocked into two upper and lower sections and a horizontal character line is extracted from each of the quadrants, the horizontal character line is constructed depending upon the relative location. In the right and left upper quadrants of the scanned image page, the horizontal character line is constructed by containing the most top characters of each vertical character line. On the other hand, in the right and left lower quadrants of the scanned image page, the horizontal character line is constructed by containing the most bottom characters of each vertical character line. In extracting a horizontal character line, the extracted horizontal character line must be longer than a predetermined length BC and a portion C of the extracted horizontal line must be in a predetermined bound portion as illustrated in FIG. 26. Alternative to the above two conditions, only either of the two conditions is used to extract an outline of the vertical character lines. When a set of the predetermined conditions is not satisfied by the vertical character lines, the outline of the vertical character lines does not exist for the purpose of correcting the distortions.

Figure 27:
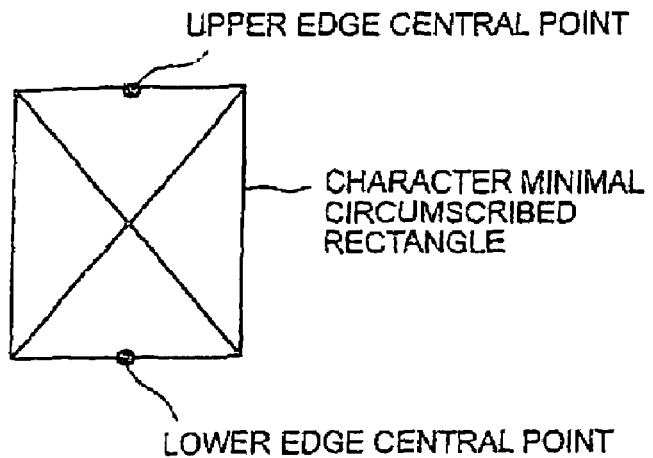
FIG. 27 is a diagram illustrating a minimal circumscribing rectangle of the character line.

After the outline of the vertical character lines is selected, the main scanning coordinates of the selected outline of the vertical character line are determined. As shown in FIG. 27, when an outline is to contain the most top characters of the vertical character lines, the central point of the upper edge of the minimal circumscribing rectangle is connected to form the outline. The outline is thus approximated, and the coordinates are determined in the main scanning direction. Similarly, FIG. 27 also shows that when an outline is to contain the most top characters of the vertical character lines, the central point of the lower edge of the minimal circumscribing rectangle is connected to form the outline. The outline is thus approximated, and the coordinates are determined in the main scanning direction. As shown in FIG. 26, the line D is a boundary line. For the extension A-B, the y coordinate is determined by a line approximation. For the extension B-D, the y coordinate is determined by a polynomial curve approximation.

Lastly, inappropriately selected vertical character lines are eliminated. When the coordinates are approximated by a polynomial equation, if the approximated curve has an undesirable shape, the distortion may be amplified during the correction process. For the above fear, the vertical character lines with the undesirable curve are eliminated. The undesirable approximated curves are not illustrated, but they have substantially the same characteristics as those of the horizontal character lines. For example, a curve is bent towards the outside of the book or exceeds the central line and cuts inside. By the above described elimination process, when a vertical character line is eliminated, no vertical character line exists for the purpose of correcting the distortions. When the vertical character line exists in the scanned image, the vertical character line is extracted, and the information on the existence of the vertical character line on the right or left page and the extracted vertical character line is temporarily stored in the RAM 33.

In the above described paragraphs, the steps S41, S42 and S43 of the preferred process as illustrated in FIG. 11 have been described. Upon completion of the steps S41, S42 and S43, the extraction of the page outline, rule lines and character lines has been completed.

Figure 28:
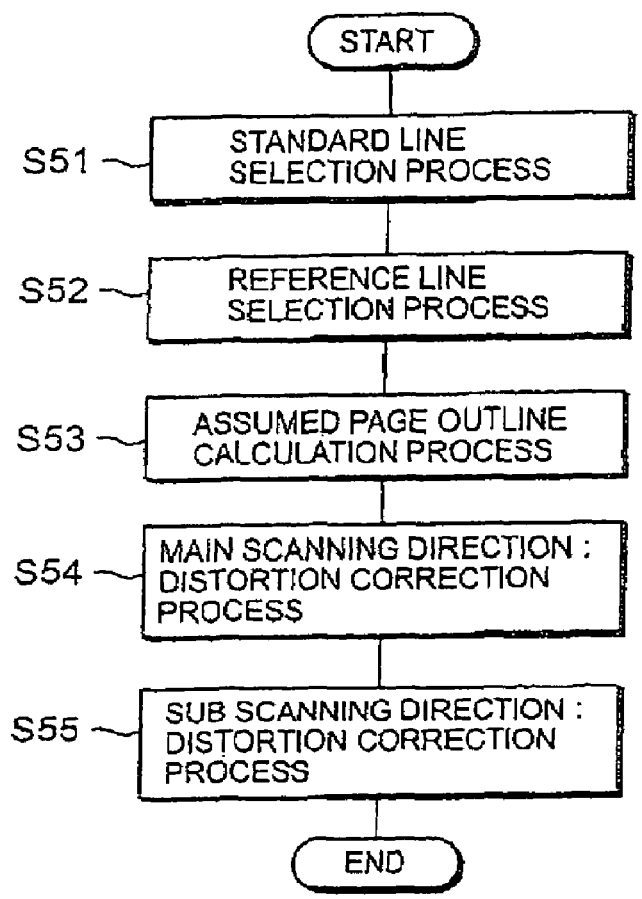
FIG. 28 is a flow chart illustrating that the distortion correction step S5 further includes steps in a preferred process of correcting distortion in the scanned image based upon the previously extracted information according to the current invention.

Referring back to FIG. 6, the distortion correction step S5 will be described in details. As shown in FIG. 28, a flow chart illustrates that the distortion correction step S5 further includes steps in a preferred process of correcting distortion in the scanned image based upon the previously extracted information according to the current invention. In general, a standard line for the distortion correction is selected from the page outline, the rule line and the character line in a step S51. The standard line is located near a tope edge or a bottom edge of the scanned image. In determining a correction rate or ratio with respect to the selected standard line, a corresponding reference line is selected from the page outline, the rule line and the character line in a step S52. The reference line is located near a tope edge or a bottom edge of the scanned image. When the standard line is either a rule line or a character line, an assumed page outline is determined in order to minimize the loss of the image information below the standard line in a step S53. Based upon the assumed page outline, the distortions are corrected in the main scanning direction by performing an expansion process on the scanned image data in a step S54. Furthermore, based upon the character minimal circumscribing rectangles, the distortions are corrected in the sub scanning direction by performing an expansion process on the scanned image data in a step S55.

Still referring to FIG. 28, the standard line and the reference line are respectively selected in the steps 51 and 52 from the page outline, the rule line and the character line that are located near either the top or bottom of the scanned image. In the preferred process, the selection priority is in the order of the page outline, the rule line and the character line. That is, the page outline>the rule line>the character line. The above selection priority is established since the character line has a lower precision or accuracy in extraction in comparison to the page outline and the rule line. With the use of the page outline that is outside the scanned image, a more precise or accurate distortion correction rate is obtained. In the preferred process, although the page outline is generally available in both right and left pages, the rule line and the character line are not necessarily available in both pages. For this reason, the standard line selection priority from the scanned image data near the top or bottom is as follows:

1) Page outline, which always exists in the right and left pages.
2) Rule line in both right and left pages.
3) Rule line in one page and Character line in the other page.
4) Character line in both right and left pages.
5) Rule line in one page and no standard line in the other page.
6) Character line in one page and no standard line in the other page.

"No standard line" means that none of the page outline, the rule line and the character line has been extracted from a particular page of the scanned image data.

The assumed page determination step S53 and the main scanning direction distortion correction step S54 will be described in view of the above described standard line selection priority.

1. Page Outline Exists at Both Top and Bottom of Scanned Image

Figure 29:
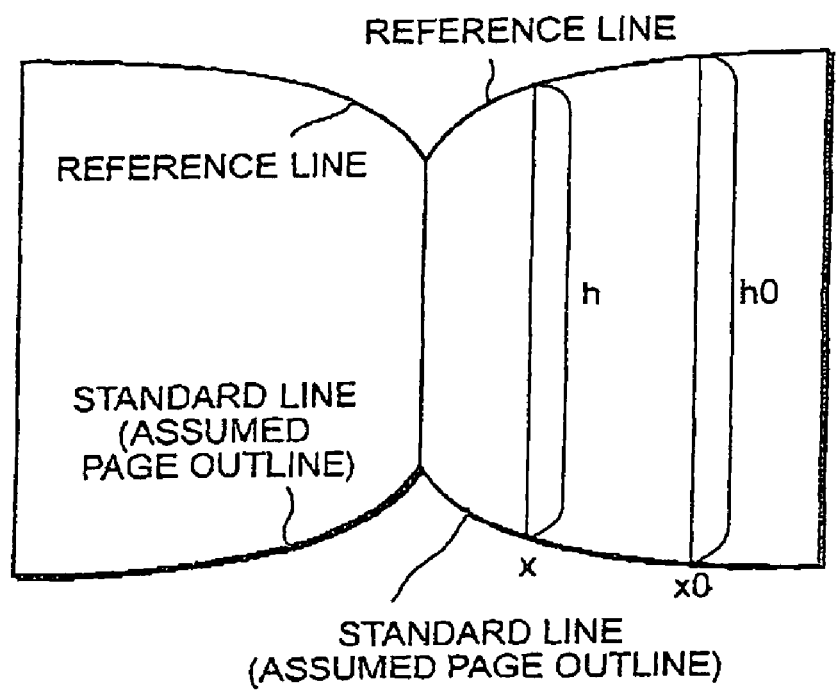
FIG. 29 is an exemplary scanned image in which the page outline exists at the top and bottom of the scanned image.
Figure 30:
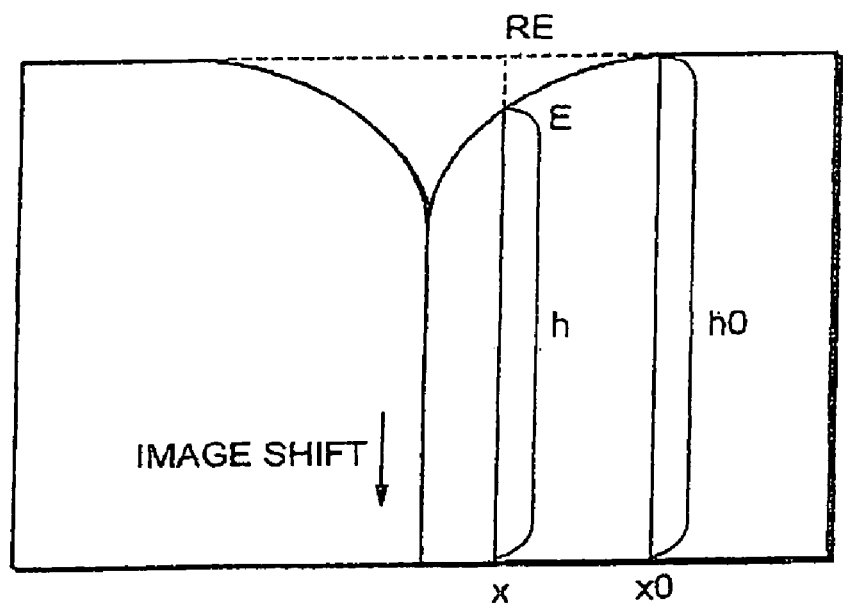
FIG. 30 is the exemplary scanned image of FIG. 29 after the pixels have been shifted.

Referring to FIG. 29, an exemplary scanned image illustrates that the page outline exists at the top and bottom of the scanned image. Either of the page outlines is used as the standard line and or the reference line. In the preferred process, the page outline, the rule line and the character line near the bottom line is selected as a standard line. The top page outline in this example is selected as the reference line. In the above example, since the standard line and the assumed page outline match, the assumed page outline determination step S53 is not performed. Referring to FIG. 30, a point x0 is a boundary point between a straight line portion and the curve line portion on the page outline. Based upon a distance h0 between the reference line and the standard line at the boundary point x0, the distortion correction ratio is determined in the main scanning direction distortion correction step S54. The distortion correction ratio is applied to expand the scanned image in the main scanning direction so that the distance is equalized between the standard line and the reference line at any position in the sub scanning direction. That is, in FIG. 30, given a distance h between the standard line and the reference line at a position x, the distortion correction ratio is expressed by the ratio h0/h. As described above, when the scanned image is expanded for correction in the main scanning direction, the correction ratio is a value for each x so that the distance is equalized between the standard line and the reference line at any position x in the sub scanning direction. To correct the distortion, as shown in FIG. 30, the pixels are initially shifted in the main scanning direction so that the assumed page outline or the standard line becomes a straight line. Then, the top portion of the scanned image is expanded in the main scanning direction at the rate of the distortion correction ratio of h0/h across any position x in the sub scanning direction. As the result of the above distortion correction in the image, the top edge E of the original page outline becomes the straight corrected top line RE as indicated by a dotted line. The function of the page outline distortion correction means is thus implemented.

Figure 31:
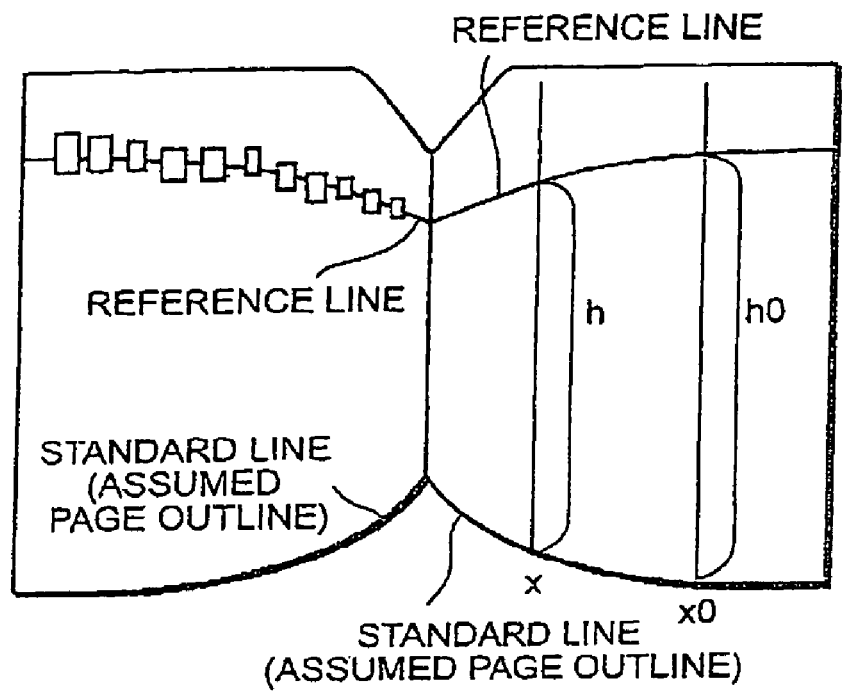
FIG. 31 is an exemplary scanned image in which a top portion of the page outline is cut off while the bottom portion includes a page outline and a character line and a rule line are available near the top.
Figure 32:
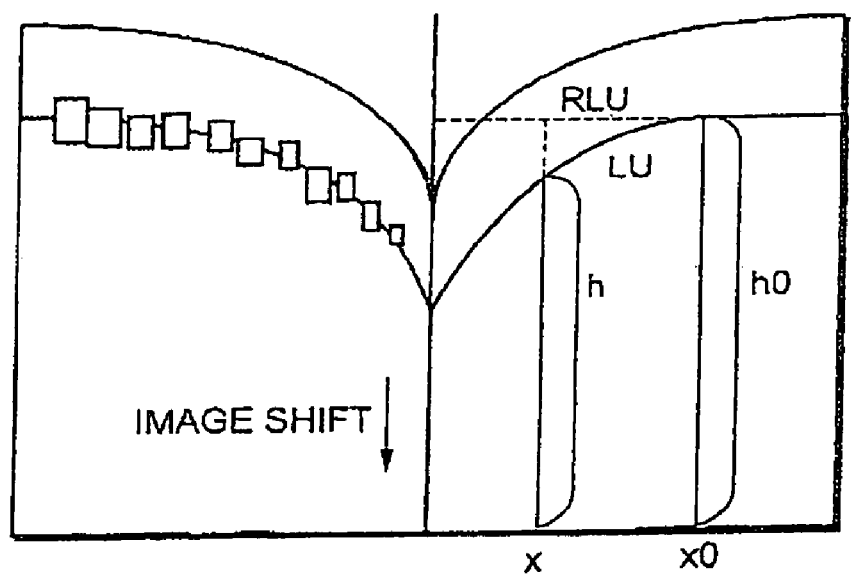
FIG. 32 is the exemplary scanned image of FIG. 31 after the pixels have been shifted.

2. Page Outline Exists at Either Edge and Rule Line or Character Line at the Other As shown in FIG. 31, an exemplary scanned image shows that a top portion of the page outline is cut off while the bottom portion includes a page outline and a character line and a rule line are available near the top. The bottom page outline is selected as a standard line. The character line on the left page and the rule line on the right page are selected as the reference line. In the above selection, since the bottom page outline and the assumed page outline match, the assumed page outline determination step 53 is not performed. Referring to FIG. 32, a point x0 is a boundary point between a straight line portion and the curve line portion on the page outline. Based upon a distance h0 between the reference line and the standard line at the boundary point x0, the distortion correction ratio is determined in the main scanning direction distortion correction step S54. Given a distance h between the standard line and the reference line at a position x, the distortion correction ratio is expressed by the ratio h0/h. To correct the distortion, as shown in FIG. 32, the pixels are initially shifted in the main scanning direction so that the assumed page outline or the standard line becomes a straight line. Then, the top portion of the scanned image is expanded in the main scanning direction at the rate of the distortion correction ratio of h0/h across any position x in the sub scanning direction. As the result of the above distortion correction in the image, the rule line LU of the right page becomes the straight corrected rule line RLU as indicated by a dotted line. Similarly, the left character line is corrected. The function of the page outline distortion correction means is thus implemented.

3. Rule Line Exists at Either Edge and Rule Line or Character Line at the Other

Figure 33:
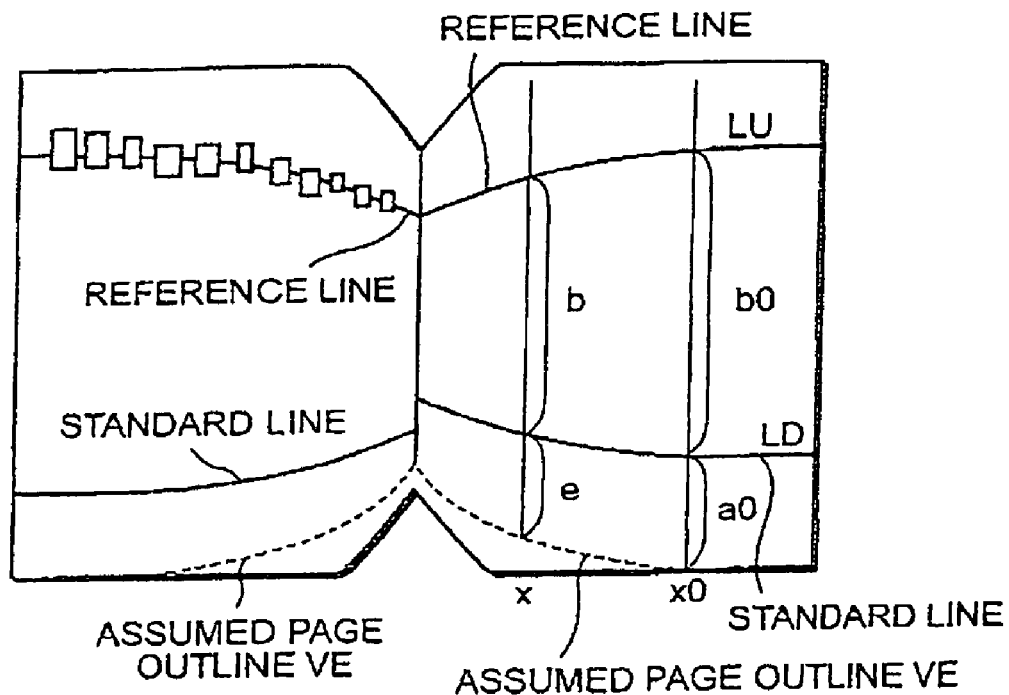
FIG. 33 is an exemplary scanned image in which a rule line exits at one end of the top and bottom on both pages and either a rule line or a character line exists at the other end.

As shown in FIG. 31, an exemplary scanned image shows that a top and bottom portions of the page outline are cut off. While the right and left pages each include a rule line at either at the top or bottom portion, the left page alone includes a character line at the top. The bottom rule lines on the right and left pages are selected as a standard line. The character line on the left page and the rule line in the right page are selected as the reference line. In the above selection, since the standard line and the assumed page outline fail to match, the standard line cannot be considered as the assumed outline page outline. Because if they are matched, when the assumed page outline or the standard line is shifted to the bottom line during the distortion correction process, the image information below the standard line is lost. For this reason, when the standard line is not the page outline, the assumed page outline determination step 53 is performed to generate the assumed page outline VE as indicated in a dotted line in FIG. 33. Referring to FIG. 32, a point x0 is a boundary point between a straight line portion and the curve line portion on the rule line LD. A distance a0 is between the boundary point x0 on the rule line LD and the bottom edge line. A distance b0 is between the boundary point x0 on the rule line LD and the rule line LU. Based upon the distance a0 and the distance b0, the assumed page outline determination process calculates the assumed page outline VE. That is, give the distance b between a position x on the rule line LD and the top rule line LU, a distance between the position x on the rule line LD and the assumed page outline VE is solved from the following equation:

$$a/b = a0/b0$$

Thus, the distance between a position x on the rule line LD and the assumed page outline VE is calculated at any position x in the sub scanning direction to determine the assumed page outline VE. The above described process is independently performed on the right and left pages.

Figure 34:
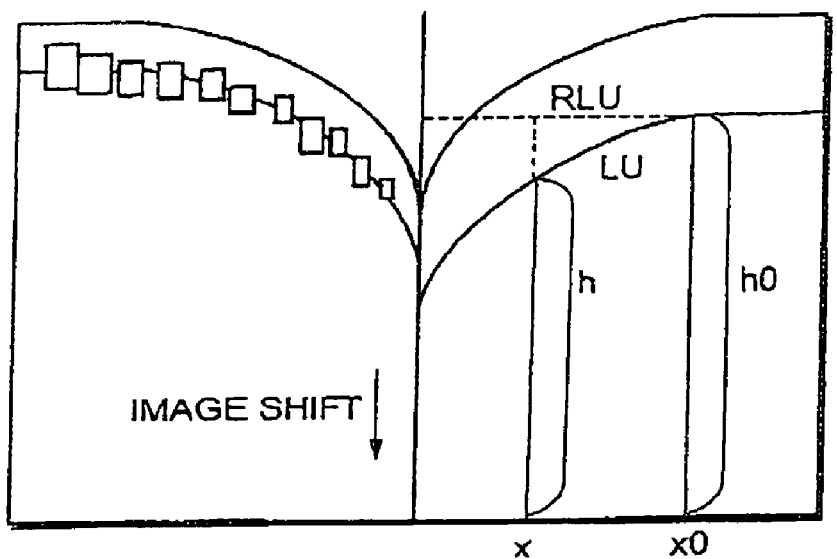
FIG. 34 is the exemplary scanned image of FIG. 33 after the pixels have been shifted.

The main scanning direction distortion correction step S54 initially requires that a distance h0 be determined by adding the distance a0 and the distance b0. As described above, the distance a0 is between the boundary point x0 on the rule line LD and the bottom edge line while the distance b0 is between the boundary point x0 on the rule line LD and the rule line LU. That is, h0=a0+b0. Based upon the distance h0, the distortion correction rate is determined. The distortion correction rate is h0/h where h is a distance between the upper rule line LU at the position x and the bottom edge at the position h. To correct the distortion, as shown in FIG. 34, the pixels are initially shifted in the main scanning direction so that the assumed page outline VE becomes a straight line on the bottom edge. Then, the top portion of the scanned image is expanded in the main scanning direction at the distortion correction ratio of h0/h across any position x in the sub scanning direction. As the result of the above distortion correction in the image, the rule line LU of the right page becomes the straight corrected rule line RLU as indicated by a dotted line. Precisely speaking, although the position x does not match the boundary between the straight line portion and the curve line portion of the rule line LU, the boundary of the rule line LD is used. Similarly, the left character line is corrected. By using the assumed page outline VE, the loss of the image is minimized for the shifting of the pixels. The function of the rule line/character line distortion correction means is thus implemented.

Figure 35:
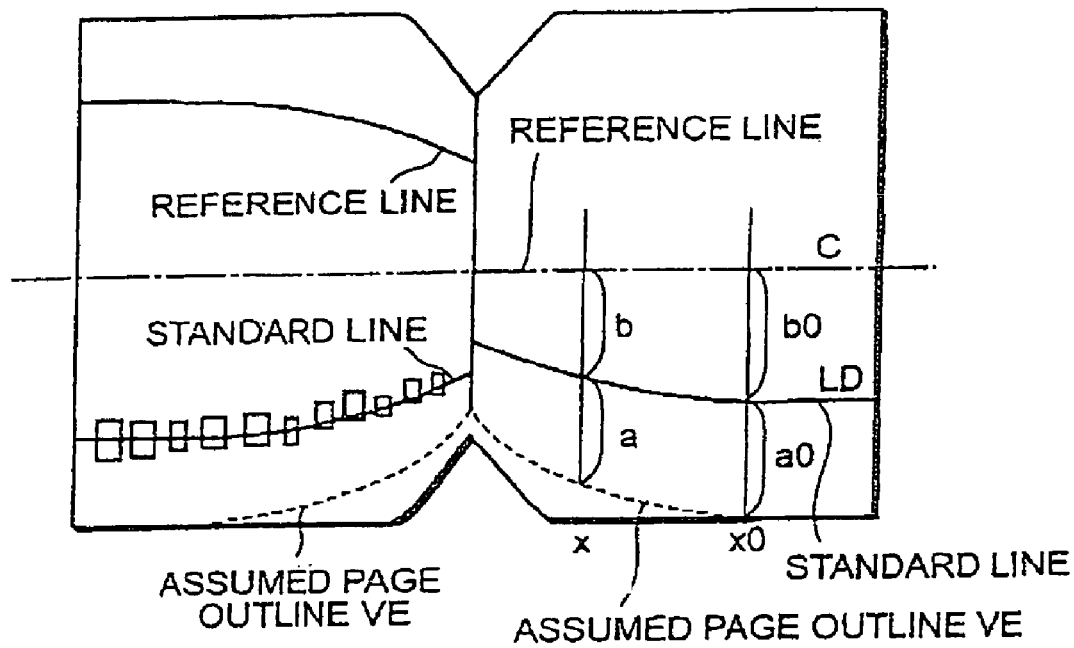
FIG. 35 is an exemplary scanned image in which at least one of the right and left pages includes the rule line and the character line at the top and the bottom of the scanned image and the other page includes only a character line either at the top or the bottom.

4. Rule Line and Character Line Exists at Either Edge on Both Pages and Rule Line at the Other As shown in FIG. 35, an exemplary scanned image shows that a top and bottom portions of the page outline are cut off. While at least one of the right and left pages includes the rule line and the character line at the top and the bottom of the scanned image, the other page includes only a character line either at the top or the bottom. The bottom character line on the left page and the bottom rule line on the right page are selected as a standard line. The upper rule line on the left page and a central line C in the sub scanning direction are selected as the reference line. The left page is the rule line while the right page has no line in this example. The central line C crosses in the sub scanning direction the central point of the main scanning line in the scanned image. The central line C is not a central line of the book original 40. In the above selection, since the standard line and the assumed page outline fail to match, the assumed page outline determination step 53 is performed to the assumed page outline VE as indicated in a dotted line in FIG. 35. Referring to FIG. 35, a point x0 is a boundary point between a straight line portion and the curve line portion on the rule line LD. A distance a0 is between the boundary point x0 on the rule line LD and the bottom edge line of the scanned image. A distance b0 is between the boundary point x0 on the rule line LD and the central line C. Based upon the distance a0 and the distance b0, the assumed page outline determination process calculates the assumed page outline VE. That is, give the distance b between a position x on the rule line LD and the central line C, a distance a between the a position x on the rule line LD and the assumed page outline VE is solved from the following equation:

$$a/b = a0/b0$$

Thus, the distance between a position x on the rule line LD and the assumed page outline VE is calculated at any position x in the sub scanning direction to determine the assumed page outline VE. The above described process is independently performed on the right and left pages. Furthermore, if the rule line exists near the top edge on the right page, the rule line is used in lieu of the central line C.

Figure 36:
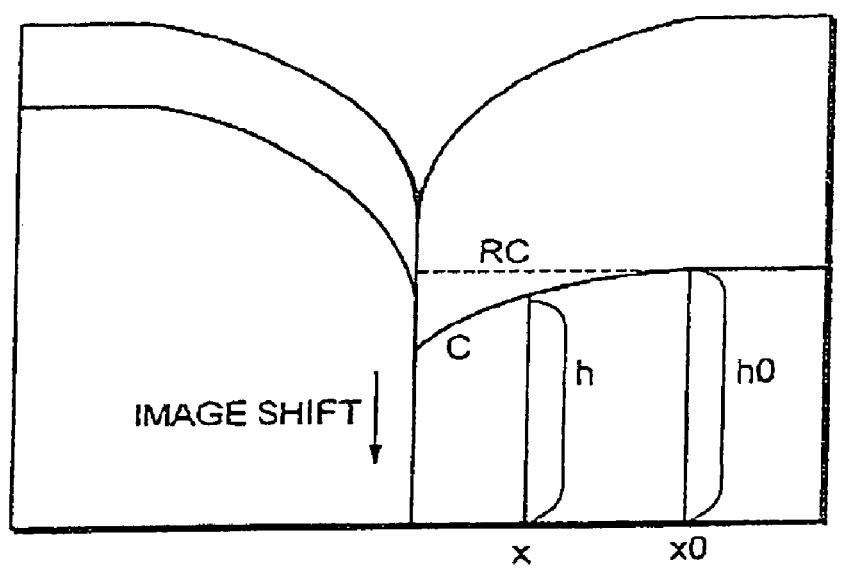
FIG. 36 is the exemplary scanned image of FIG. 35 after the pixels have been shifted.

The main scanning direction distortion correction step S54 initially requires that a distance h0 be determined by adding the distance a0 and the distance b0. As described above, the distance a0 is between the boundary point x0 on the rule line LD and the bottom edge line while the distance b0 is between the boundary point x0 on the rule line LD and the central line C. That is, h0=a0+b0. Based upon the distance h0, the distortion correction rate is determined. The distortion correction rate is h0/h where h is a distance between the central line at the position x and the bottom edge at the position h. To correct the distortion, as shown in FIG. 36, the pixels are initially shifted in the main scanning direction so that the assumed page outline VE becomes a straight line on the bottom edge. Then, the top portion of the scanned image is expanded in the main scanning direction at the distortion correction ratio of h0/h across any position x in the sub scanning direction. The central line becomes distorted after the above pixel shift. As the result of the above distortion correction in the image, the distorted central line C of the right page becomes the straight corrected line RC as indicated by a dotted line. However, the image correction is not perfect unless the central line C matches the optical axis of the scanner 1. Similarly, the left character line is corrected. The function of the rule line/character line distortion correction means is thus implemented.

Figure 37:
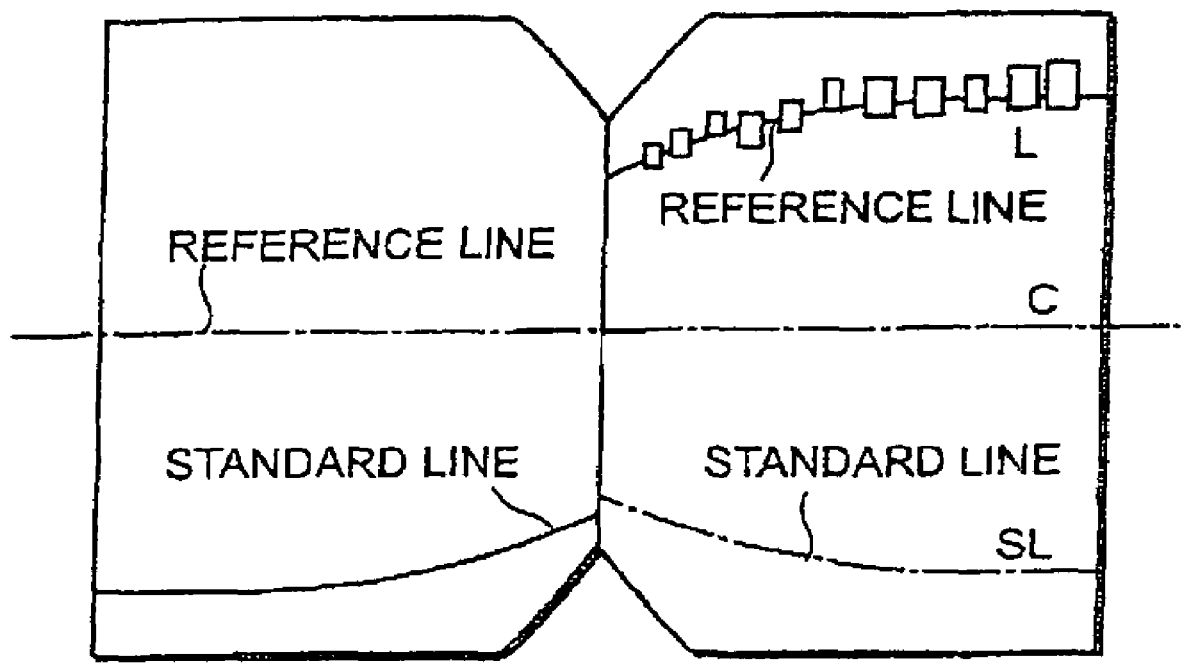
FIG. 37 is an exemplary scanned image in which at least one of the right and left pages includes the rule line either at the top or the bottom of the scanned image and the other page includes only a character line either at the top or the bottom.

5. Rule Line and Character Line Exists at Either Edge on Both Pages and Rule Line at the Other As shown in FIG. 37, an exemplary scanned image shows that a top and bottom portions of the page outline are cut off. While at least one of the right and left pages includes the rule line either at the top or the bottom of the scanned image, the other page includes only a character line either at the top or the bottom. The bottom rule line on the left page is selected as a standard line. Furthermore, an additional standard line SL is generated on the right page by making a mirror image of the character line L across a central line C, which crosses a central point of the main scanning line in the sub scanning direction. On the right page, the upper character line is selected as the reference line. On the left page where the rule line exists, the central line C is selected as the reference line. The determination of the distortion correction rate and the pixel shift and the correction for the above example is substantially the same as those for the previous examples, and the description of these steps are not reiterated here. The function of the rule line/character line distortion correction means is thus implemented.

Figure 38:
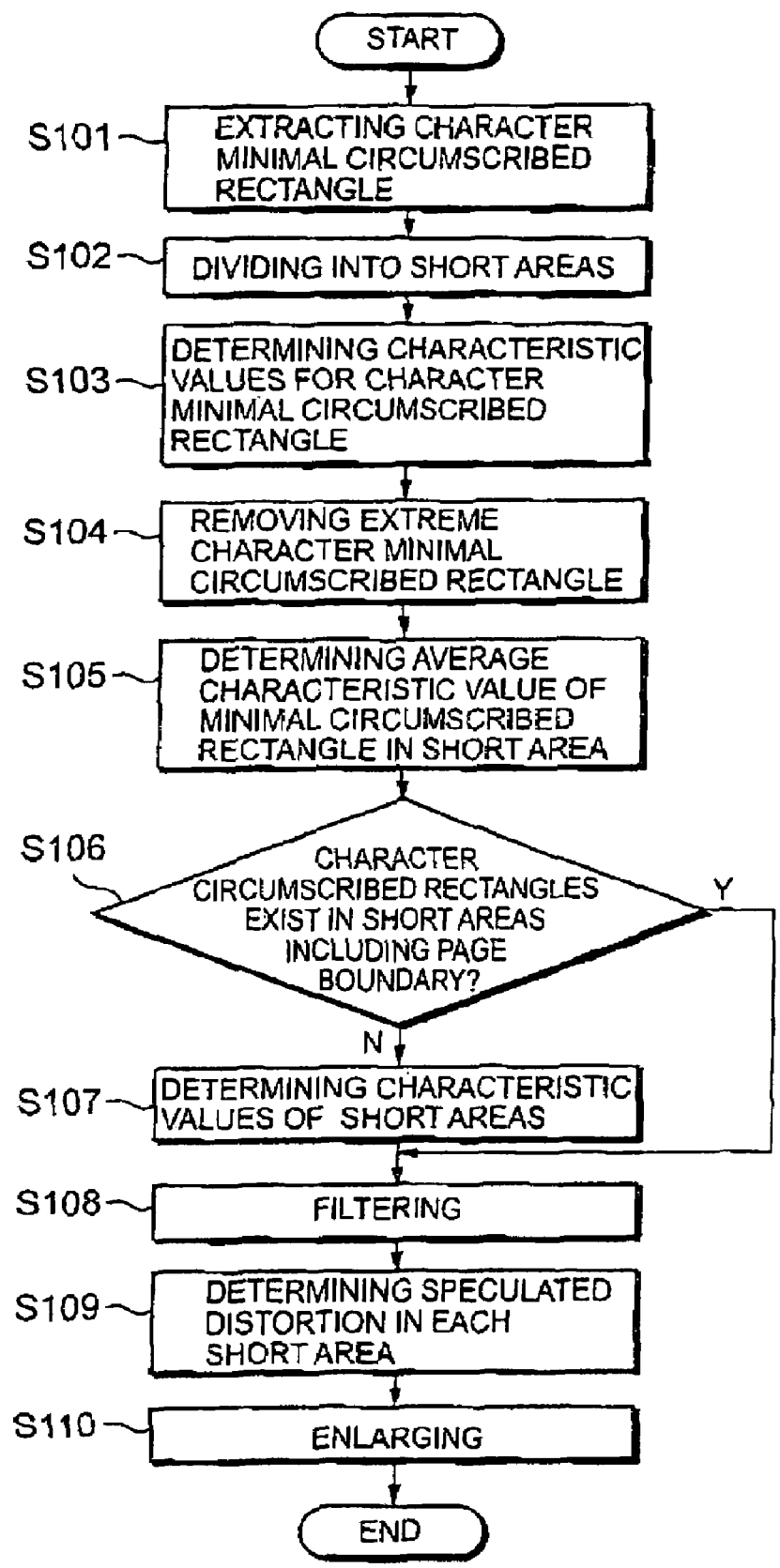
FIG. 38 is a flow chart illustrating steps involve in a preferred process of the sub scanning direction distortion correction step according to the current invention.
Figure 39:
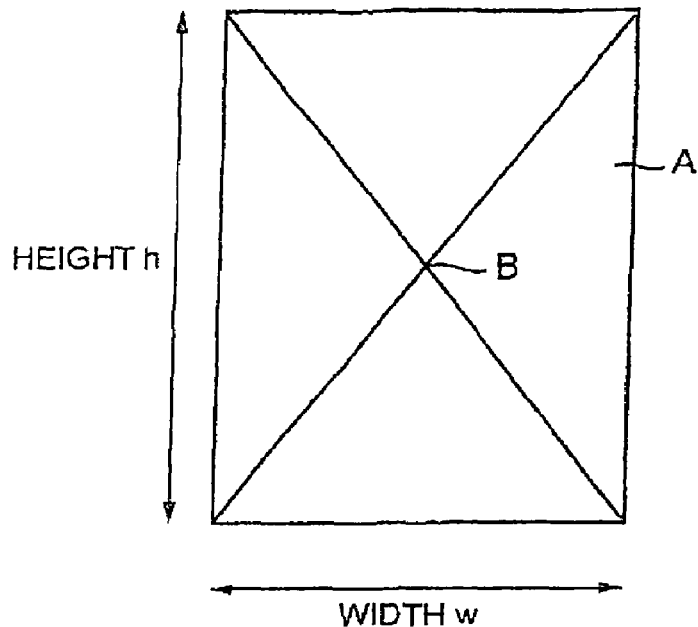
FIG. 39 is a diagram illustrating a height h, a width w and a central point of the extracted character minimal circumscribing rectangle.

Now referring to FIG. 38, a flow chart illustrates steps involve in a preferred process of the sub scanning direction distortion correction step 55 according to the current invention. The sub scanning direction distortion correction step 55 is the last step of the distortion correction as shown in FIG. 28. In a step S101, a character minimal circumscribing rectangle A is extracted as shown in FIG. 39 from the scanned image that has been corrected in the main scanning direction. Since the character recognition process is prior art, the related description will not be duplicated. The extracted character minimal circumscribing rectangle A is used to determine an amount of distortion in the sub scanning direction. As shown in FIG. 39, a height h, a width w and a central point B are defined with respect to the extracted character minimal circumscribing rectangle A. The central point B is a crossing point of diagonal lines of the minimal circumscribing rectangle A.

Figure 40:
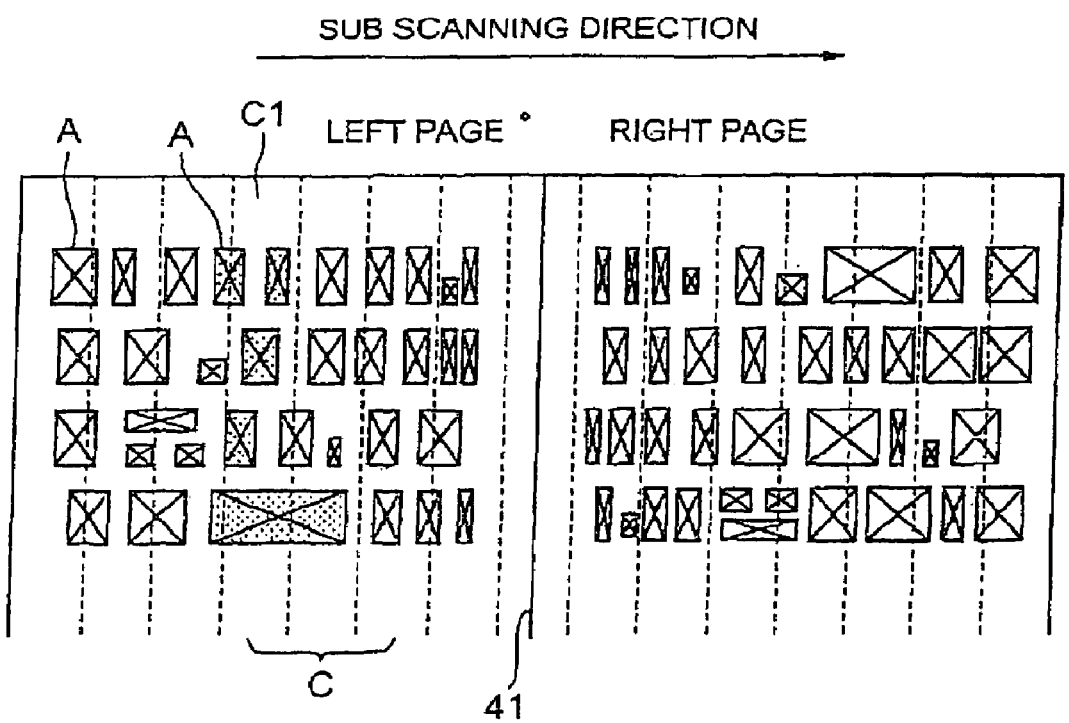
FIG. 40 is a diagram illustrating the short width areas that are parallel to the bound line.
Figure 41:
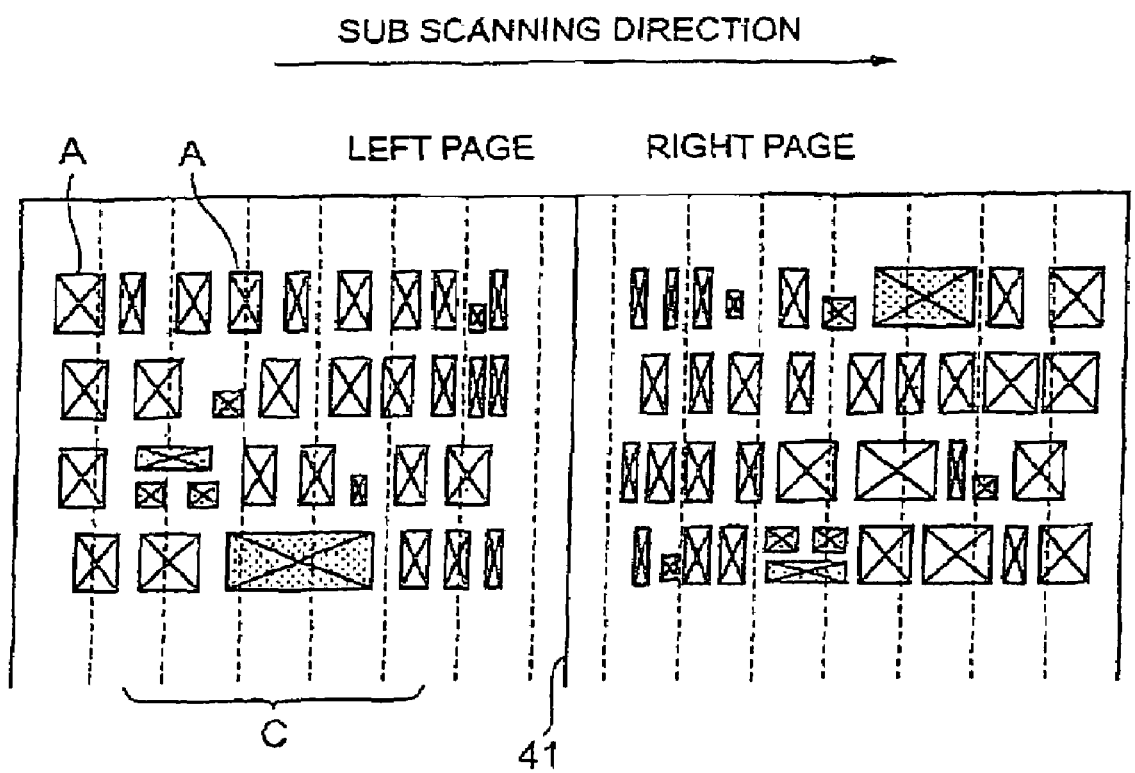
FIG. 41 is a diagram illustrating the short width areas that are to be removed.

Still referring to FIG. 38, the scanned image is divided into a plurality of short width areas C, which are in parallel to the bound portion 41 of the bound book original 40 in a step S102. As shown in FIG. 40, a diagram illustrates the above described short width areas that are parallel to the bound line 41. In a step S103, the characteristics of the minimal circumscribing rectangle A is determined for each of the short width areas C. If the center of a particular minimal circumscribing rectangle A resides with in a particular short width area, the particular minimal circumscribing rectangle A belongs to the particular short width areas C. For example, the minimal circumscribing rectangles are shaded to indicate that they belong to a short width area C1 on the left page of the scanned image. The characteristic value of the minimal circumscribing rectangle A is determined by w/h of the minimal circumscribing rectangle A, where w is the width and h is the height of the minimal circumscribing rectangle A. The characteristic value for each of the short width areas C is determined by averaging the w/h value of all of the minimal circumscribing rectangles A that belong to the corresponding short width area C. The average w/h value is not always useful since some characters such as a comma and some mathematical symbols have a small size. As a result, the w/h value is not as stable. In certain other situations, the minimal circumscribing rectangles are fused with each other during the extraction process, and the corresponding width becomes undesirably too large. For the above reason, it is necessary that certain w values and predetermined characters be removed before the characteristic value is determined in a step S104. In the step S104, if a h value or a w/h ratio is smaller than a predetermined corresponding threshold value, the associated minimal circumscribing rectangle A is removed from the characteristic determination. As the result of the above screening process, as shown in FIG. 41, the shaded minimal circumscribing rectangles A are removed and not used in determining the characteristic value.

Figure 42:
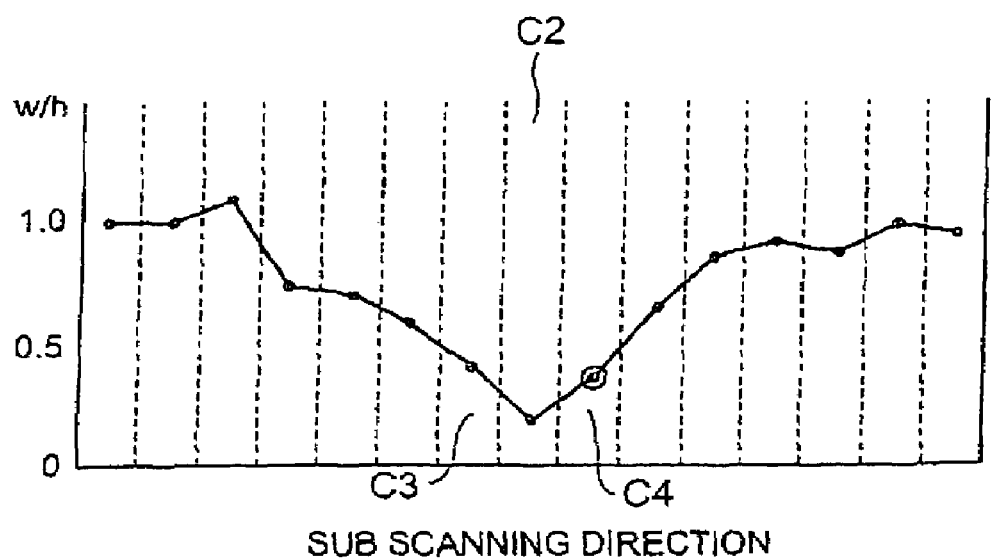
FIG. 42 is a graph illustrating an exemplary average w/h value for each of the short width areas.
Figure 43:
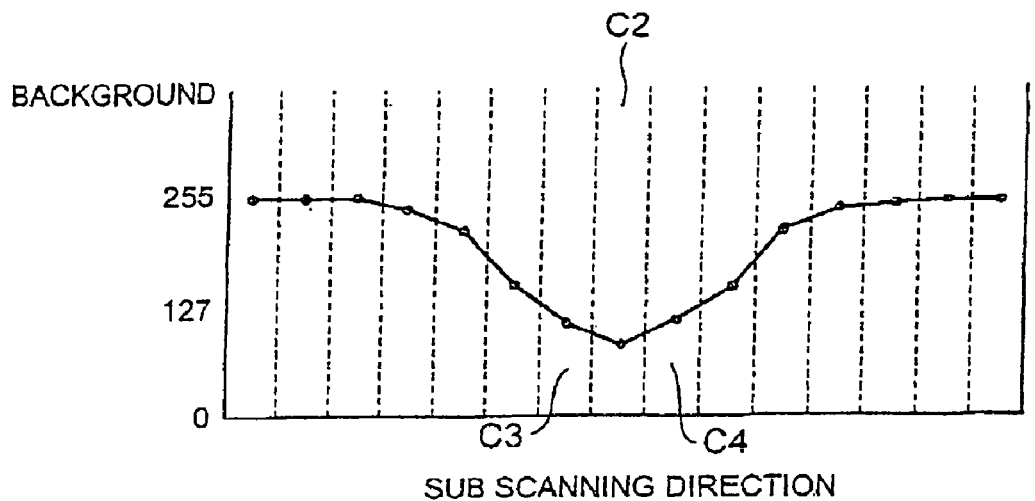
FIG. 43 is a graph illustrating one example of the background change.

Referring back to FIG. 38, after removing certain minimal circumscribing rectangles A, the average w/h ratio of the minimal circumscribing rectangles A is determined for each of the short width areas C. FIG. 42 illustrates an exemplary average w/h value for each of the short width areas C. A short width area C2 in FIG. 42 indicates that the bound portion 41 of the book original 40 is included in the short width area C2. In a step S106, it is determined whether or not the short width area C2 containing the bound portion 41 of the book original 40 includes any one of the minimal circumscribing rectangles A. As shown in FIG. 41, in general, the minimal circumscribing rectangles A do not exist in the bound portion 41 of the book original 40. If it is determined in the step S106 that the short width area C2 containing the bound portion 41 of the book original 40 includes any one of the minimal circumscribing rectangles A, the preferred process proceeds to a step S108 since the characteristic value has been already determined using the minimal circumscribing rectangles A in the bound portion 41. On the other hand, if it is determined in the step S106 that the short width area C2 containing the bound portion 41 fails to include any one of the minimal circumscribing rectangles A, the preferred process proceeds to a step S107, where the characteristic value of the short width area C2 is determined in a different manner. The short width area C2 containing the bound portion 41 is identified by a comparison of the background change of the scanned image in each of the short width areas C. A short width area having the least background value is considered to be the short width area C2 containing the bound portion 41. FIG. 43 illustrates one example of the above described background change. Since the short width area C2 has the least background value, the short width area C2 is considered to contain the bound portion 41. When the scanned image is color, one of the primary colors such as R, G or B is used to determine the above described background change for identifying the short width area C containing the bound portion. Alternatively, the RGB data is converted into a chromatic portion and a luminance portion, and the luminance portion is used for identifying the short width area C containing the bound portion.

Figure 44:
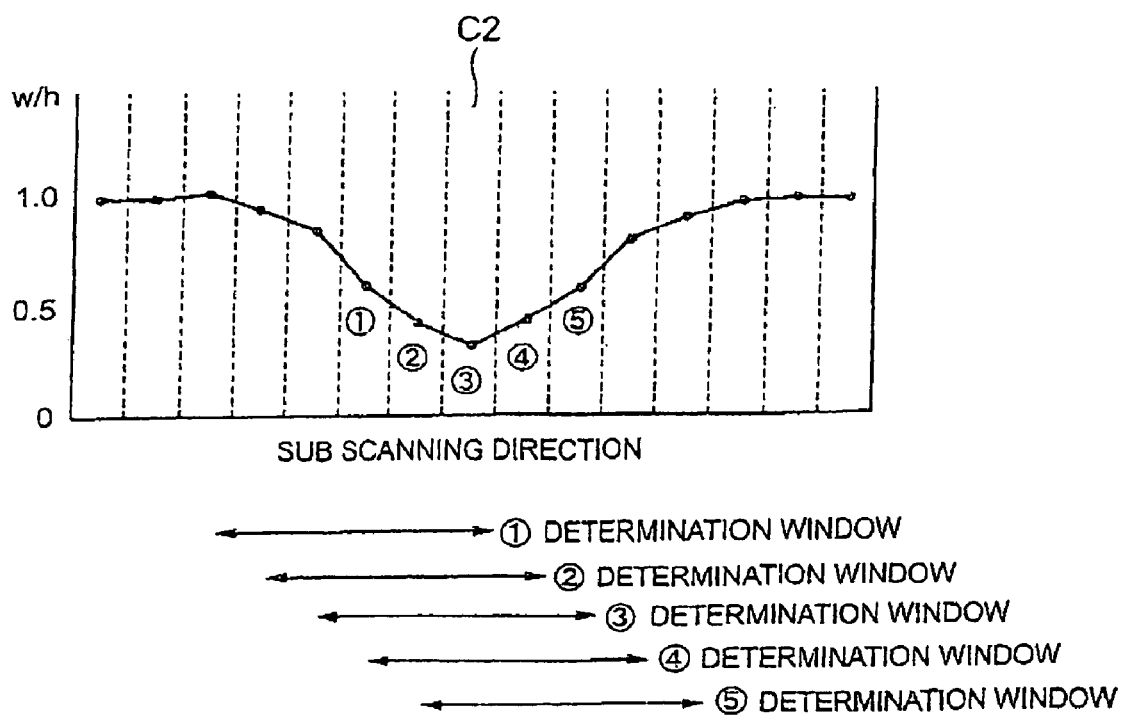
FIG. 44 is a graph illustrating the result of the filtering process on the characteristic values using the window having a certain width.
Figure 45:
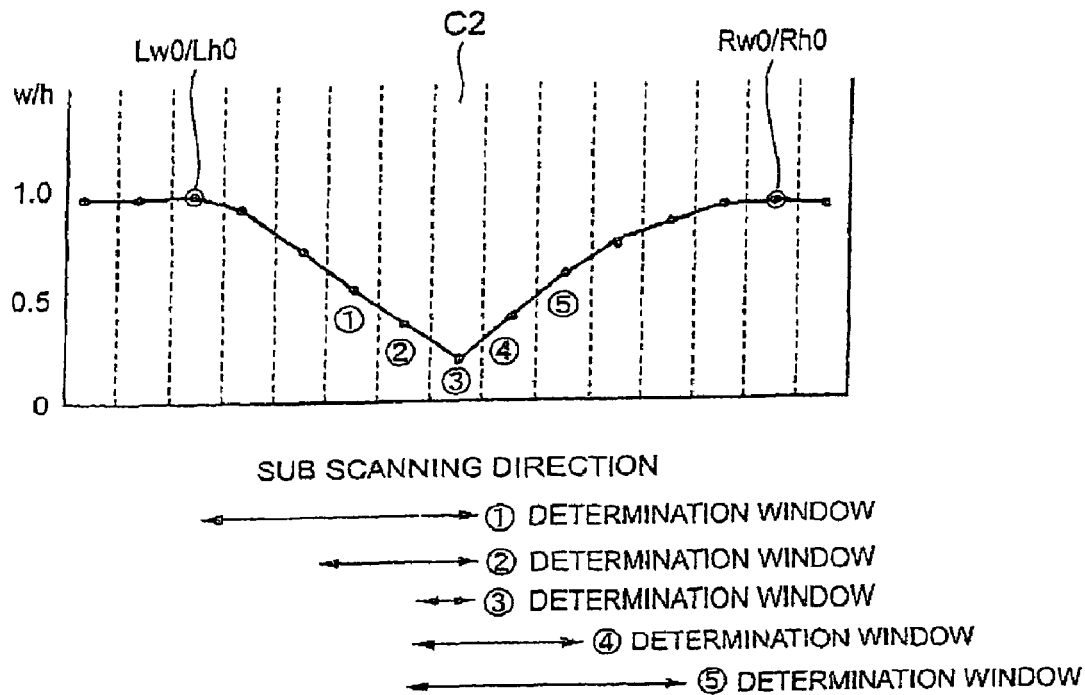
FIG. 45 is a graph illustrating the results of the adjusted window filtering process.

In the step S107, the characteristic value of the short width area C2 containing the bound portion 41 is determined by multiplying the characteristic value of the adjacent short width area C by a predetermined value. That is, in the example as shown in FIG. 42, the characteristic value of the short width area C2 containing the bound portion 41 is determined by multiplying the characteristic value of the adjacent short width areas C3 or C4 by a predetermined value such as 0.5. In this example, the right adjacent short width area C4 is used. In a subsequent step S108, a filtering process is performed on the above determined characteristic value for each short width area C. For example, a moving average is determined in the sub scanning direction to make the characteristic value change in a gradual manner with respect to the position of the short width area C. A special process is performed on the short width areas C near the short width area C2 containing the bound portion 41 of the book original 40. If the same window is used for filtering across the sub scanning direction, a sharp change in the characteristic value near the bound portion 41 of the book original 40 is lost. FIG. 44 is a graph illustrating the result of the filtering process on the characteristic values using the window having the width of 5. The result in FIG. 44 shows that the characteristic value (w/h) near the bound portion 41 of the book original 40 becomes too gradual. Because of the gradual change in the characteristic value, it becomes impossible to perform the image correction process in a proper manner near the bound portion 41. To avoid the gradual change in the characteristic value, the filtering window width is adjusted over the adjacent short width areas C3 and C4 near the bound portion 41. FIG. 45 illustrates the results of the adjusted window filtering process. Since the characteristic values (w/h) change properly near the bound portion 41 after the adjusted window filtering process, an image correction process is desirably performed on the above image data.

In a step 109, a speculated distortion amount is determined for each of the short width areas C as described below. Initially, a standard short width area is selected as a standard for the purpose of determining an amount of distortion in each of the short width areas C. According to the preferred process, the short width area having the least amount of distortion is selected as the standard short width area. For example, the standard short width area is the one having the maximal characteristic value (w/h). The standard short width area is commonly selected for the right and left pages. Alternatively, the standard short width area is independently selected for the right and left pages. In FIG. 45, the standard short width area is independently selected for the right and left pages. The left standard short width area has a first characteristic value of Lw0/Lh0 while the right standard short width area has a second characteristic value of Rw0/Rh0. Subsequently, the characteristic value w0/h0 in the standard short width area is defined as the standard characteristic value for the entire scanned image. The speculated distortion amount is determined by the following equation for each of the short width areas.

(characteristic value of each short width area)/(standard characteristic value)=$(w/h)/(w0/h0)$ If a short width area C outside the bound portion 41 of the book original 40 is selected as the standard short width area, it is conceivable that the difference in font and font size is too large to determine a proper speculated distortion amount. For dealing with the above described image, it is useful to limit a search area for the standard short width area within the vicinity of the bound portion 41 of the book original 40. To realize the above described process, the standard short width area is selected from the short width areas having a background value above a predetermined value.

Figure 46:
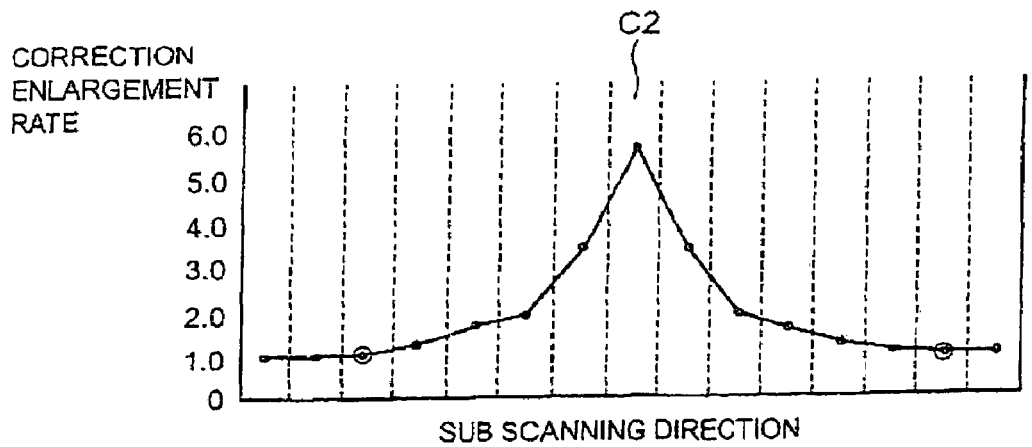
FIG. 46 is a graph illustrating correction enlargement ratios based upon the characteristic values as shown in FIG. 45.

Finally, an enlargement process is performed on the scanned image data in a step S110 of FIG. 38 to enlarge the short width area C in the sub scanning direction in order to correct the distortion near the bound portion 41 of the book original 40. The enlargement ratio is inverse of the speculated distortion amount that is determined in the step S109. That is, the following equation shows the inverse relation:

(standard characteristic value)/(characteristic value of each short width area)=$(w0/h0)/(w/h)$ If the standard short width area is commonly defined for the right and left pages, the above enlargement ratio is also commonly determined for the right and left pages. Conversely, if the standard short width area is independently defined for the right and left pages, the above enlargement ratio is also independently determined for the right and left pages. FIG. 46 illustrates correction enlargement ratios based upon the characteristic values as shown in FIG. 45. Since the short width areas C that are far away from the bound portion 41 are highly unlikely to have distortion, it is better not to include these areas for the enlargement correction. It is possible to have unnatural distortion in these short width areas after the enlargement process. To avoid the above undesirable effect, the speculated distortion amount is set to "1" for the short width areas C whose background level is below a predetermined threshold value. When a common enlargement ratio is used, since the correction enlargement ratio is discontinuous among the adjacent short width areas C, the corrected image becomes unnatural. For this reason, the correction enlargement ratios are adjusted in advance to be continuously changing for the adjacent short width areas. For example, as shown in FIG. 46, the correction enlargement ratio for the central part in each of the short width areas C is plotted as an inverse value of the speculated distortion amount. The above described points are interpolated by the straight lines, and the correction enlargement ratios are provided for other parts of the short width areas C. Thus, the correction enlargement ratios have been established for the scanned image in the sub scanning direction. The image enlargement process is implemented by the three dimensional convolution method that is often used in a variable scaling function for copiers.

Figure 47:
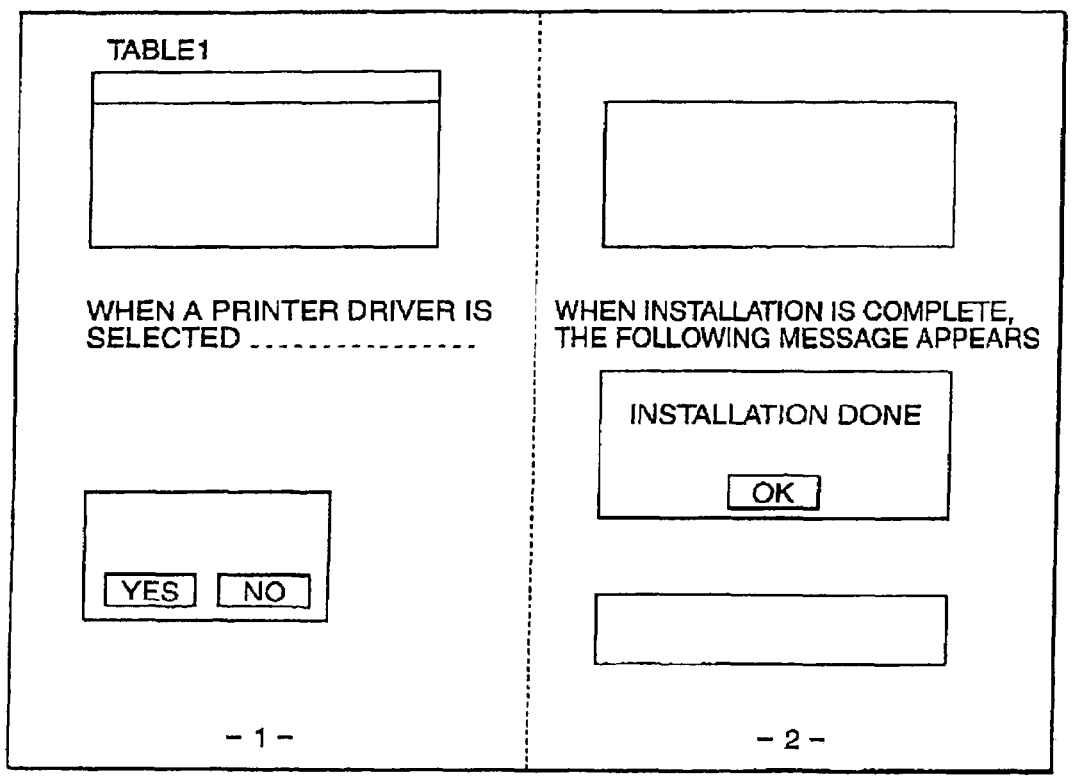
FIG. 47 is a plain view of the corrected image that had contained the distortions near the bound portion in the book original 40 as shown in FIG. 8.
Figure 48:
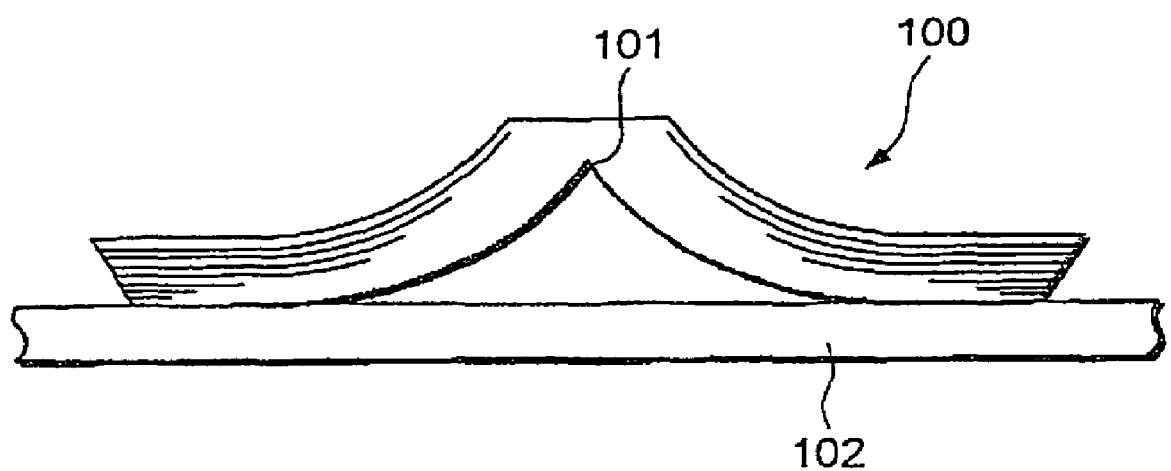
FIG. 48 is a diagram illustrating that a bound portion of a book is lifted and not contacting the contact glass surface during a duplication process.

The above described steps S101 through 110 complete the distortion correction process for the sub scanning direction, and the distortion correction of the scanned image in FIG. 6 is also completed. As the result of the above described distortion correction process, FIG. 47 is a plain view of the corrected image that had contained the distortions near the bound portion 41 in the book original 40 as shown in FIG. 8.

As described above, to correct the distortion in the scanned image, it is initially determined whether or not a page outline exists in the scanned image. If the page outline exists, the distortion is corrected based upon the page outline rather than the rule line or the character line. The page outline is more stably extracted than the rule line or the character line. Since the page outline is generally located closest to the top or bottom edge of the scanned image, the page outline has a substantial amount of distortion. Because of the substantial distortion in the page outline, the distorted shape and its distortion ratio is steadily and accurately speculated. The page outline is used to improve the precision in correcting the distortions in the scanned image. If the rule line is to be used in lieu of the page outline in correcting the distortions in the scanned image, the rule line candidates are extracted for further examination. If a rule line candidate has a fewer than a predetermined threshold number of breaks, the rule line candidate is considered to be a bona fide rule line. The above examination enables to prevent the erroneous extraction of dotted lines and small character lines for the rule line and improves the precision in correcting the distortions in the scanned image based upon the rule line. Furthermore, based upon the reversed black-and-white histogram, it is determined whether the text is orientated in a vertical or horizontal direction. Although the character areas and the photographic areas may have a similar value in a black pixel histogram, the character or text area values are higher than the photographic area values in a reversed black-and-white histogram. Thus, the confusion between the text areas and the character areas is avoided by the use of the reversed black-and-white histogram. Since a photographic part is prevented from erroneously recognized as a character part, the precision in correcting distortions in the scanned image is improved by the use of the character line shape.

In the above described preferred embodiment, the distortion correction is performed on the scanned image data from the scanner 1 of the digital copier 16 by the image distortion correction device in the image formation or digital copier 16. The current invention is not limited to the above arrangement of the preferred embodiment. For example, an image scanner for scanning an original image is connected to a personal computer, and the software program stored in a storage medium such as a CD-ROM 37 is installed in a HDD of the personal computer. The software program has implemented the above described various tasks and functions of the image distortion correction device.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of correcting distortion caused by scanning, comprising the steps of:
   scanning an original in a main scanning direction and a sub scanning direction into scanned image data;
   determining whether any of a predetermined correction data set of a page outline, a rule line and a character line exists in the scanned image data; and
   correcting the distortion based upon the correction data set, the rule line and the character line being used alone or in combination if the page outline does not exist in the scanned image data.

2. The method of correcting distortion caused by scanning according to claim 1 wherein the page outline is determined by generating a histogram in the main scanning direction for a number of pixels having a pixel values beyond a predetermined threshold value in the sub scanning direction.

3. The method of correcting distortion caused by scanning according to claim 1 wherein the original is a bound material, the scanned image data having at least a page of the bound material, the page having two edges including a top edge and a bottom edge.

4. The method of correcting distortion caused by scanning according to claim 3 wherein the pixels having the highest pixel values in the sub scanning direction form a boundary line in a bound portion of the bound material. , 5. The method of correcting distortion caused by scanning according to claim 4 wherein a histogram is generated in a main scanning direction for a number of pixels having a pixel value beyond a predetermined threshold value in a sub scanning direction, a rule line candidate being selected from the scanned image data based upon a predetermined pattern in the histogram.

6. The method of correcting distortion caused by scanning according to claim 5 wherein a number of breaks in the rule line candidate is determined and is compared to a predetermined threshold break number, the rule line candidate having the breaks fewer than the predetermined threshold break number being selected as a rule line.

7. The method of correcting distortion caused by scanning according to claim 6 wherein an optimal rule line is selected from the rule lines for correcting the distortion, the optimal rule line having a length that is longer than a predetermined threshold length value.

8. The method of correcting distortion caused by scanning according to claim 7 wherein the optimal rule line partially overlapping the bound portion.

9. The method of correcting distortion caused by scanning according to claim 8 wherein the optimal rule line being closest to one of the two edges of the scanned image data.

10. The method of correcting distortion caused by scanning according to claim 9 wherein the scanned image data has two pages, the optimal rule line being selected to be the closest to each of the two edges of each of the two pages.

11. The method of correcting distortion caused by scanning according to claim 9 wherein the optimal rule line having the largest distortion in the main scanning direction.

12. The method of correcting distortion caused by scanning according to claim 6 wherein an optimal rule line is selected from the rule lines for correcting the distortion, the optimal rule line having a proper approximation line by a polynomial equation near the boundary line.

13. The method of correcting distortion caused by scanning according to claim 4 wherein a histogram is generated in a main scanning direction for a number of pixels whose pixel value has been reversed according to a predetermined threshold value in a sub scanning direction, a character line candidate being selected from the scanned image data based upon a distribution pattern in the histogram.

14. The method of correcting distortion caused by scanning according to claim 13 wherein the character line candidate is vertically orientated in the scanned image data.

15. The method of correcting distortion caused by scanning according to claim 13 wherein the character line candidate is horizontally orientated in the scanned image data.

16. The method of correcting distortion caused by scanning according to claim 13 wherein an optimal character line is selected from the character line candidates for correcting the distortion, the optimal character line having a length that is longer than a predetermined threshold length value.

17. The method of correcting distortion caused by scanning according to claim 16 wherein the optimal character line partially overlapping the bound portion.

18. The method of correcting distortion caused by scanning according to claim 17 wherein the optimal character line being closest to one of the two edges of the scanned image data.

19. The method of correcting distortion caused by scanning according to claim 18 wherein the scanned image data has two pages, the optimal character line being selected to be the closest to each of the two edges of each of the two pages.

20. The method of correcting distortion caused by scanning according to claim 18 wherein the optimal character line has the largest distortion in the main scanning direction.

21. The method of correcting distortion caused by scanning according to claim 13 wherein an optimal character line is selected from the rule lines for correcting the distortion, the optimal character line having a proper approximation line by a polynomial equation near the boundary line.

22. The method of correcting distortion caused by scanning according to claim 14 wherein a character at the top of each of the vertical character line candidates is grouped into a horizontal character line.

23. The method of correcting distortion caused by scanning according to claim 14 wherein the character has a minimal circumscribing rectangle having a top edge, a central point of the top edge being a coordinate of the character.

24. The method of correcting distortion caused by scanning according to claim 14 wherein a character at the bottom of each of the vertical character line candidates is grouped into a horizontal character line.

25. The method of correcting distortion caused by scanning according to claim 14 wherein the character has a minimal circumscribing rectangle having a bottom edge, a central point of the bottom edge being a coordinate of the character.

26. The method of correcting distortion caused by scanning according to claim 4 wherein said correcting step further comprises additional steps of:
   determining a first correction ratio in the main scanning direction based upon a central line that passes through each element of the correction data set;
   correcting the scanned image data in the main scanning direction based upon the first correction ratio to generate a first corrected scanned image data;
   extracting a minimal circumscribing rectangle around a character in the first corrected scanned image data;
   determining a second correction ratio in the sub scanning direction based upon the extracted minimal circumscribing rectangle; and
   correcting the first corrected scanned image data in the sub scanning direction based upon the second correction ratio to generate a second corrected scanned image data.

27. The method of correcting distortion caused by scanning according to claim 26 wherein the first correction ratio in the main scanning direction is determined based upon an assumed page outline near one end of the scanned image data and a reference line near the other end of the scanned image data, the assumed page outline being determined based upon a standard line that is one of the correction data set and a reference line that is one of the correction data set, the reference line alternately being a central line passing through the scanned image data.

28. The method of correcting distortion caused by scanning according to claim 27 wherein the first correction ratio is a ratio between a first distance and a second distance, the first distance being between the assumed page outline and the reference line at a predetermined point x0 in the sub scanning direction, the second distance being between the assumed outline and an arbitrary point x in the sub scanning direction.

29. The method of collecting distortion caused by scanning according to claim 28 wherein the predetermined point x0 is a boundary point between a straight line portion and a curve portion on the assumed page outline.

30. The method of correcting distortion caused by scanning according to claim 28 wherein the predetermined point x0 is located on a straight line portion of the assumed page outline.

31. The method of correcting distortion caused by scanning according to claim 28 further comprising additional steps of:
   shifting pixels of the scanned image data in the main scanning direction so that the assumed page outline becomes straight in shifted image data; and
   expanding the shifted image data in the main scanning direction based upon the first correction ratio at any point in the sub scanning direction across the assumed page outline.

32. The method of collecting distortion caused by scanning according to claim 29 further comprising additional steps of:
   shifting pixels of the scanned image data in the main scanning direction so that the assumed page outline becomes straight in shifted image data; and
   expanding the shifted image data in the main scanning direction based upon the first correction ratio at a point in the sub scanning direction only across the curved portion in the assumed page outline.

33. The method of correcting distortion caused by scanning according to claim 29 further comprising additional steps of:
   shifting pixels of the scanned image data in the main scanning direction so that the assumed page outline becomes straight in shifted image data; and
   expanding the shifted image data in the main scanning direction based upon the first correction ratio at a point in the sub scanning direction only between the boundary point and the bound portion in the assumed page outline.

34. The method of correcting distortion caused by scanning according to claim 26 wherein scanned image data has a right page and a left page, said steps of claim 26 are independently repeated for each of the right and left pages.

35. The method of correcting distortion caused by scanning according to claim 26 further comprising an additional step of printing the second corrected scanned image data.

36. A system for correcting distortion caused by scanning, comprising:
   a scanner for scanning an original in a main scanning direction and a sub scanning direction into scanned image data;
   an image data processing unit connected to said scanner unit for determining whether any of a predetermined correction data set of a page outline, a rule line and a character line exists in the scanned image data; and
   an image distortion correction unit connected to said image data processing unit for correcting the distortion based upon the correction data set, the rule line and the character line being used alone or in combination if the page outline does not exist in the scanned image data.

37. The system for correcting distortion caused by scanning according to claim 36 wherein said image data processing unit further comprises a page outline determination unit for determining the page outline by generating a histogram in the main scanning direction for a number of pixels having a pixel values beyond a predetermined threshold value in the sub scanning direction.

38. The system for correcting distortion caused by scanning according to claim 36 wherein the original is a bound material, the scanned image data having at least a page of the bound material, the page having two edges including a top edge and a bottom edge.

39. The system for correcting distortion caused by scanning according to claim 38 wherein the pixels having the highest pixel values in the sub scanning direction form a boundary line in a bound portion of the bound material.

40. The system for correcting distortion caused by scanning according to claim 39 wherein said image data processing unit further comprises a rule line determination unit for determining the rule line candidate by generating a histogram in a main scanning direction for a number of pixels having a pixel value beyond a predetermined threshold value in a sub scanning direction, the rule line candidate being selected from the scanned image data based upon a predetermined pattern in the histogram.

41. The system for correcting distortion caused by scanning according to claim 40 wherein said rule line determination unit determines a number of breaks in the rule line candidate and compares the break number to a predetermined threshold break number, said rule line determination unit selecting the rule line candidate having the breaks fewer than the predetermined threshold break number as a rule line.

42. The system for correcting distortion caused by scanning according to claim 41 wherein an optimal rule line is selected from the rule lines for correcting the distortion, the optimal rule line having a length that is longer than a predetermined threshold length value.

43. The system for correcting distortion caused by scanning according to claim 42 wherein the optimal rule line partially overlapping the bound portion.

44. The system for correcting distortion caused by scanning according to claim 43 wherein the optimal rule line being closest to one of the two edges of the scanned image data.

45. The system for correcting distortion caused by scanning according to claim 44 wherein the scanned image data has two pages, the optimal rule line being selected to be the closest to each of the two edges of each of the two pages.

46. The system for correcting distortion caused by scanning according to claim 44 wherein the optimal rule line having the largest distortion in the main scanning direction.

47. The system for correcting distortion caused by scanning according to claim 41 wherein an optimal rule line is selected from the rule lines for correcting the distortion, the optimal rule line having a proper approximation line by a polynomial equation near the boundary line.

48. The system for correcting distortion caused by scanning according to claim 39 wherein said image data processing unit further comprises a character line determination unit for determining a character line candidate by generating a histogram in a main scanning direction for a number of pixels whose pixel value has been reversed according to a predetermined threshold value in a sub scanning direction, the character line candidate being selected from the scanned image data based upon a distribution pattern in the histogram.

49. The system for correcting distortion caused by scanning according to claim 48 wherein the character line candidate is vertically orientated in the scanned image data.

50. The system for correcting distortion caused by scanning according to claim 48 wherein the character line candidate is horizontally orientated in the scanned image data.

51. The system for correcting distortion caused by scanning according to claim 48 wherein an optimal character line is selected from the character line candidates for correcting the distortion, the optimal character line having a length that is longer than a predetermined threshold length value.

52. The system for correcting distortion caused by scanning according to claim 41 wherein the optimal character line partially overlapping the bound portion.

53. The system for correcting distortion caused by scanning according to claim 42 wherein the optimal character line being closest to one of the two edges of the scanned image data.

54. The system for correcting distortion caused by scanning according to claim 43 wherein the scanned image data has two pages, the optimal character line being selected to be the closest to each of the two edges of each of the two pages.

55. The system for correcting distortion caused by scanning according to claim 43 wherein the optimal character line has the largest distortion in the main scanning direction.

56. The system for correcting distortion caused by scanning according to claim 49 wherein said character line determination unit groups a character at the top of each of the vertical character line candidates into a horizontal character line.

57. The system for correcting distortion caused by scanning according to claim 56 wherein the character has a minimal circumscribing rectangle having a top edge, a central point of the top edge being a coordinate of the character.

58. The system for correcting distortion caused by scanning according to claim 57 wherein an optimal character line is selected from the rule lines for correcting the distortion, the optimal character line having a proper approximation line by a polynomial equation near the boundary line.

59. The system for correcting distortion caused by scanning according to claim 49 wherein said character line determination unit groups a character at the bottom of each of the vertical character line candidates into a horizontal character line.

60. The system for correcting distortion caused by scanning according to claim 59 wherein the character has a minimal circumscribing rectangle having a bottom edge, a central point of the bottom edge being a coordinate of the character.

61. The system for correcting distortion caused by scanning according to claim 39 wherein said image distortion correction unit further comprises:
   a first correction ratio determination unit for determining a first correction ratio in the main scanning direction based upon a central line that passes through each element of the correction data set;
   a first correction unit connected to said first correction ratio determination unit for correcting the scanned image data in the main scanning direction based upon the first correction ratio to generate a first corrected scanned image data;
   an extracting unit for extracting a minimal circumscribing rectangle around a character in the first corrected scanned image data;
   a second correction ratio determination unit connected to said extraction unit for determining a second correction ratio in the sub scanning direction based upon the extracted minimal circumscribing rectangle; and
   a second correction unit connected to said second correction ratio determination unit for correcting the first corrected scanned image data in the sub scanning direction based upon the second correction ratio to generate a second corrected scanned image data.

62. The system for correcting distortion caused by scanning according to claim 61 wherein said first correction ratio determination unit determines the first correction ratio in the main scanning direction based upon an assumed page outline near one end of the scanned image data and a reference line near the other end of the scanned image data, the assumed page outline being determined based upon a standard line that is one of the correction data set and a reference line that is one of the correction data set, the reference line alternately being a central line passing through the scanned image data.

63. The system for correcting distortion caused by scanning according to claim 62 wherein the first correction ratio is a ratio between a first distance and a second distance, the first distance being between the assumed page outline and the reference line at a predetermined point x0 in the sub scanning direction, the second distance being between the assumed outline and an arbitrary point x in the sub scanning direction.

64. The system for correcting distortion caused by scanning according to claim 63 wherein the predetermined point x0 is a boundary point between a straight line portion and a curve portion on the assumed page outline.

65. The system for correcting distortion caused by scanning according to claim 63 wherein the predetermined point x0 is located on a straight line portion of the assumed page outline.

66. The system for correcting distortion caused by scanning according to claim 63 wherein said first correction unit further comprises:
a pixel shifting unit for shifting pixels of the scanned image data in the main scanning direction so that the assumed page outline becomes straight in shifted image data; and
a first expansion unit connected to said pixel shifting unit for expanding the shifted image data in the main scanning direction based upon the first correction ratio at any point in the sub scanning direction across the assumed page outline.

67. The system for correcting distortion caused by scanning according to claim 64 wherein said first correction unit further comprises:
a pixel shifting unit for shifting pixels of the scanned image data in the main scanning direction so that the assumed page outline becomes straight in shifted image data; and
a first expansion unit connected to said pixel shifting unit for expanding the shifted image data in the main scanning direction based upon the first correction ratio at a point in the sub scanning direction only across the curved portion in the assumed page outline.

68. The system for correcting distortion caused by scanning according to claim 64 wherein said first correction unit further comprises:
a pixel shifting unit for shifting pixels of the scanned image data in the main scanning direction so that the assumed page outline becomes straight in shifted image data; and
a first expansion unit connected to said pixel shifting unit for expanding the shifted image data in the main scanning direction based upon the first correction ratio at a point in the sub scanning direction only between the boundary point and the bound portion in the assumed page outline.

69. The system for correcting distortion caused by scanning according to claim 61 wherein scanned image data has a right page and a left page, said first correction ratio determination unit, said first correction unit, said extracting unit, said second correction ratio determination unit and said second correction unit independently process each of the right and left pages.

70. The system for correcting distortion caused by scanning according to claim 61 further comprising a printer connected to said second correction unit for printing the second corrected scanned image data.

71. A computer-readable medium storing a computer program for correcting distortion caused by scanning, the computer program performing the tasks of:
scanning an original in a main scanning direction and a sub scanning direction into scanned image data;
determining whether any of a predetermined correction data set of a page outline, a rule line and a character line exists in the scanned image data; and
correcting the distortion based upon the correction data set, the rule line and the character line being used alone or in combination if the page outline does not exist in the scanned image data.

72. The computer-readable medium storing a computer program for correcting distortion caused by scanning according to claim 71 wherein said determining task further comprises additional tasks of:
generating a histogram in the main scanning direction for a number of pixels having a pixel values beyond a predetermined threshold value in the sub scanning direction; and
determining the page outline based upon the histogram.

73. The computer-readable medium storing a computer program for correcting distortion caused by scanning according to claim 71 wherein the original is a bound material, the scanned image data having at least a page of the bound material, the page having two edges including a top edge and a bottom edge, the pixels having the highest pixel values in the sub scanning direction forming a boundary line in a bound portion of the bound material.

74. The computer-readable medium storing a computer program for correcting distortion caused by scanning according to claim 71 wherein said determining task further comprises additional tasks of:
generating a histogram in a main scanning direction for a number of pixels having a pixel value beyond a predetermined threshold value in a sub scanning direction; and
selecting a rule line candidate from the scanned image data based upon a predetermined pattern in the histogram.

75. The computer-readable medium storing a computer program for correcting distortion caused by scanning according to claim 74 further comprising:
determining a number of breaks in the rule line candidate;
comparing the number of the breaks to a predetermined threshold break number; and
selecting the rule line candidate having the breaks fewer than the predetermined threshold break number as a rule line.

76. The computer-readable medium storing a computer program for correcting distortion caused by scanning according to claim 75 further comprising additional tasks of:
selecting an optimal rule line having a length that is longer than a predetermined threshold length value;
selecting the optimal rule line that partially overlaps the bound portion; and
selecting the optimal rule line that is the closest to one of the two edges of the scanned image data, wherein the optimal rule line is selected from the rule lines for correcting the distortion.

77. The computer-readable medium storing a computer program for of correcting distortion caused by scanning according to claim 76 wherein the optimal rule line having the largest distortion in the main scanning direction.

78. The computer-readable medium storing a computer program for correcting distortion caused by scanning according to claim 73 further comprising additional tasks of:
generating a histogram in a main scanning direction for a number of pixels whose pixel value has been reversed according to a predetermined threshold value in a sub scanning direction; and selecting a character line candidate from the scanned image data based upon a distribution pattern in the histogram.

79. The computer-readable medium storing a computer program for correcting distortion caused by scanning according to claim 78 further comprising additional tasks of:
selecting from the character line candidates an optimal character line having a length that is longer than a predetermined threshold length value for correcting the distortion;
selecting the optimal character line that partially overlaps the bound portion; and
selecting the optimal character line that is the closest to one of the two edges of the scanned image data.

80. The computer-readable medium storing a computer program for correcting distortion caused by scanning according to claim 79 wherein the optimal character line has the largest distortion in the main scanning direction.

81. The computer-readable medium storing a computer program for correcting distortion caused by scanning according to claim 73 wherein said correcting task further comprises additional task of:
determining a first correction ratio in the main scanning direction based upon a central line that passes through each element of the correction data set;
correcting the scanned image data in the main scanning direction based upon the first correction ratio to generate a first corrected scanned image data;
extracting a minimal circumscribing rectangle around a character in the first corrected scanned image data;
determining a second correction ratio in the sub scanning direction based upon the extracted minimal circumscribing rectangle; and
correcting the first corrected scanned image data in the sub scanning direction based upon the second correction ratio to generate a second corrected scanned image data.

82. The computer-readable medium storing a computer program for correcting distortion caused by scanning according to claim 81 wherein the first correction ratio in the main scanning direction is determined based upon an assumed page outline near one end of the scanned image data and a reference line near the other end of the scanned image data, the assumed page outline being determined based upon a standard line that is one of the correction data set and a reference line that is one of the correction data set, the reference line alternately being a central line passing through the scanned image data.

83. The computer-readable medium storing a computer program for correcting distortion caused by scanning according to claim 82 wherein the first correction ratio is a ratio between a first distance and a second distance, the first distance being between the assumed page outline and the reference line at a predetermined point $x0$ in the sub scanning direction, the second distance being between the assumed outline and an arbitrary point x in the sub scanning direction.

84. The computer-readable medium storing a computer program for correcting distortion caused by scanning according to claim 83 wherein the predetermined point $x0$ is a boundary point between a straight line portion and a curve portion on the assumed page outline.

85. The computer-readable medium storing a computer program for correcting distortion caused by scanning according to claim 83 wherein the predetermined point $x0$ is located on a straight line portion of the assumed page outline.

86. The computer-readable medium storing a computer program for correcting distortion caused by scanning according to claim 83 further comprising additional tasks of:
shifting pixels of the scanned image data in the main scanning direction so that the assumed page outline becomes straight in shifted image data; and
expanding the shifted image data in the main scanning direction based upon the first correction ratio at any point in the sub scanning direction across the assumed page outline.

87. The computer-readable medium storing a computer program for correcting distortion caused by scanning according to claim 84 further comprising additional tasks of:
shifting pixels of the scanned image data in the main scanning direction so that the assumed page outline becomes straight in shifted image data; and
expanding the shifted image data in the main scanning direction based upon the first correction ratio at a point in the sub scanning direction only across the curved portion in the assumed page outline.

88. The computer-readable medium storing a computer program for correcting distortion caused by scanning according to claim 84 further comprising additional tasks of:
shifting pixels of the scanned image data in the main scanning direction so that the assumed page outline becomes straight in shifted image data; and
expanding the shifted image data in the main scanning direction based upon the first correction ratio at a point in the sub scanning direction only between the boundary point and the bound portion in the assumed page outline.

89. The computer-readable medium storing a computer program for correcting distortion caused by scanning according to claim 81 wherein scanned image data has a right page and a left page, said tasks of claim 81 are independently repeated for each of the right and left pages.

90. The computer-readable medium storing a computer program for correcting distortion caused by scanning according to claim 81 further comprising an additional task of printing the second corrected scanned image data.

* * * * *